US011244538B2

(12) United States Patent
Nordby

(10) Patent No.: US 11,244,538 B2

(45) **Date of Patent: *Feb. 8, 2022**

(54) GAMES, LOTTERIES, AND SWEEPSTAKES AND TICKETS, SYSTEMS, TECHNOLOGIES, AND METHODS RELATED THERETO

(71) Applicant: Multilot AS, Oslo (NO)

(72) Inventor: Reidar Magnus Nordby, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,546

(22) Filed: Sep. 16, 2019

(65) Prior Publication Data

US 2020/0151995 A1 May 14, 2020

Related U.S. Application Data

(63) Continuation-in-part of application No. 15/968,702, filed on May 1, 2018, now Pat. No. 10,565,823, which is a continuation of application No. 13/737,857, filed on Jan. 9, 2013, now Pat. No. 9,990,808, which is a continuation-in-part of application No. 13/518,831, filed as application No. PCT/IB2010/003501 on Dec. 22, 2010, now Pat. No. 9,987,550.

(60) Provisional application No. 62/859,722, filed on Jun. 11, 2019, provisional application No. 62/846,532, filed on May 10, 2019, provisional application No. 62/846,536, filed on May 10, 2019, provisional (Continued)

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ........ *G07F 17/329* (2013.01); *G07F 17/3255* (2013.01)

(58) Field of Classification Search

USPC ...................... 463/17, 20, 22, 25, 39, 40, 42

See application file for complete search history.

(56) References Cited

U.S. PATENT DOCUMENTS

| | | | |
|---|---|---|---|
| 5,227,874 | A | 7/1993 | Kohom |
| 6,024,641 | A | 2/2000 | Sarno |

(Continued)

FOREIGN PATENT DOCUMENTS

| | | | |
|---|---|---|---|
| CA | 2758163 | A1 | 6/2011 |
| GB | 2431260 | A | 4/2007 |
| WO | 2007027245 | A2 | 3/2007 |

OTHER PUBLICATIONS

CA 2801658, Office Action (CIPO dated Sep. 11, 2019).

Nt'l Search Report & Written Opinion, PCT/IB2019/001157 (Isa-Eu Feb. 18, 2020).

*Primary Examiner* — Adetokunbo O Torimiro

(74) *Attorney, Agent, or Firm* — Pequignot + Myers; Matthew A. Pequignot

(57) ABSTRACT

Games, lotteries, and/or sweepstakes as well as tickets, systems, technologies, and/or methods related thereto. In some embodiments, unique games and/or unique administrations of games and/or unique tickets useful for participating in games. In certain preferred embodiments, games which can be administrated or participated in contemporaneously with an event, such as a sporting event, music performance, or trade show (e.g., at the same time or during a live event). In certain of such preferred embodiments, participants in games make no payment to participate in the games.

16 Claims, 10 Drawing Sheets

Related U.S. Application Data application No. 62/846,506, filed on May 10, 2019, provisional application No. 62/731,636, filed on Sep. 14, 2018, provisional application No. 61/584,661, filed on Jan. 9, 2012, provisional application No. 61/302,924, filed on Feb. 9, 2010, provisional application No. 61/289,096, filed on Dec. 22, 2009.

(56) References Cited

U.S. PATENT DOCUMENTS

| | | | |
|---|---|---|---|
| 6,760,476 | B2 | 7/2004 | Meder |
| 7,035,626 | B1 | 4/2006 | Luciano, Jr. |
| 7,780,522 | B2 | 8/2010 | Lutnick et al. |
| 2001/0003099 | A1 | 6/2001 | Kohorn |
| 2004/0073439 | A1 | 4/2004 | Shuster |
| 2006/0063589 | A1 | 3/2006 | Chong |
| 2007/0026926 | A1 | 2/2007 | Romanik |
| 2007/0060285 | A1 | 3/2007 | White et al. |
| 2007/0270205 | A1 | 11/2007 | Al-Ziyoud |
| 2008/0026810 | A1 | 1/2008 | Walker et al. |
| 2008/0058057 | A1 | 3/2008 | Lau et al. |
| 2008/0113733 | A1 | 5/2008 | Kushner |
| 2008/0233984 | A1 | 9/2008 | Franklin |
| 2009/0150671 | A1 | 6/2009 | Abe |
| 2009/0280886 | A1 | 11/2009 | Randhawa |
| 2010/0197376 | A1 | 8/2010 | Kerr |
| 2010/0325009 | A1 | 12/2010 | Rajan et al. |
| 2013/0012288 | A1 | 1/2013 | Nordby et al. |

GAMES, LOTTERIES, AND SWEEPSTAKES AND TICKETS, SYSTEMS, TECHNOLOGIES, AND METHODS RELATED THERETO

CROSS-REFERENCE TO RELATED APPLICATIONS

This application claims the benefit of U.S. Provisional Application No. 62/859,722, filed on 2019 Jun. 11, U.S. Provisional Application No. 62/846,532, filed on 2019 May 10, U.S. Provisional Application No. 62/846,536, filed on 2019 May 10, U.S. Provisional Application No. 62/846,506, filed on 2019 May 10, and U.S. Provisional Application No. 62/731,636, filed on 2018 Sep. 14; and is a continuation in part of U.S. application Ser. No. 15/968,702, filed on 2018 May 1, which is a continuation of U.S. application Ser. No. 13/737,857, filed on 2013 Jan. 9, which claims the benefit of U.S. Provisional Application No. 61/584,661, filed on 2012 Jan. 9, and is a continuation in part of Ser. No. 13/518,831, filed on 2012 Sep. 27, which was the National Stage of International Application No. PCT/IB2010/003501, filed on 2010 Dec. 22, which claims the benefit of U.S. Provisional Application No. 61/302,924, filed on 2010 Feb. 9 and U.S. Provisional Application No. 61/289,096, filed on 2009 Dec. 22. All claims of priority to such applications are hereby made, and the entireties of all the above-identified applications are hereby incorporated by reference.

BACKGROUND OF THE DISCLOSURE

Field of Invention

This invention relates to games, lotteries, and/or sweepstakes as well as to tickets, systems, technologies, and/or methods related thereto. In some embodiments, this invention relates to unique games and/or unique administrations of games and/or unique tickets useful for participating in games. In certain preferred (but not all) embodiments, this invention relates to games which can be administrated or participated in contemporaneously with an event, such as a sporting event, music performance, or trade show (e.g., at the same time or during a live event). In certain of (but not all of) such preferred embodiments, participants in the games make no payment to participate in the games.

Background of the Invention

Lotteries have existed in various forms throughout the world for hundreds of years. Typical modem lottery formats often involve the selection by a customer or entrant of a pre-determined quantity of lottery numbers (e.g., from a range of numbers) such as by writing such numbers down on a paper form which is submitted to a store clerk. Once the lottery ticket is paid for, such numbers are then entered into a machine which prints, on a second piece of paper, a lottery ticket which is issued to the lottery customer. Lottery winners in such conventional lotteries are eventually chosen by a lottery administrator which—via one or more conventional methods—draws or randomly selects winning numbers which an entrant must have selected, and thereby have a paper ticket with numbers matching the winning numbers, to win the lottery prize. If the lottery ticket is lost, the contestant—even if he or she were a winner—would be unable to collect his/her prize. In such lottery types, because the contestant is able to choose whatever numbers he or she desires, multiple winners may result in a given lottery draw (i.e., which necessitates prize sharing). Conversely, because there is no guarantee that the numbers drawn will precisely match any set of numbers chosen by a lottery contestant, a given lottery draw may result in no winner at all.

In a popular second type of lottery format, paper tickets are sold to lottery customers which are a scratch-off type or variety. With such a lottery ticket, often the ticket is predetermined as either a winner or a loser and the customer discovers the "result" of the ticket by scratching or rubbing off an opaque film which conceals whether the ticket is a winning or losing ticket. Because of the simplicity of their design and implementation, there are often a large variety of scratch-off lottery ticket types which compete with one another.

As most conventional lottery types employ paper tickets, not only does the printing of massive numbers of throw away tickets have an environmental impact, but it also requires substantial financial expenditure by the lottery provider to design, print, store, and ship the tickets to large numbers of geographic locations.

Moreover, despite certain benefits of lotteries such as when portions of profits are used to fund local governments or charities, there are certain social stigmas associated with lotteries because of their possible impact among those susceptible to gambling addiction, for example. Further, often those people in the least wealthy social classes are the persons purchasing the most lottery tickets.

Finally, there has been a decline in the popularity of lotteries in recent years (at least in certain markets and countries) possibly due to lack of excitement or enthusiasm associated with conventional lottery types. In this regard, the public has arguably become sensitized to the conventional lottery formats and therefore does not participate in lotteries in historically high numbers.

Recognizing the above-described drawbacks of conventional lottery types, certain needs in the lottery arts have been identified by the inventors of the application for patent contained herein. Similar needs have been identified related to games and sweepstakes, as well as in relation to systems, technologies, and/or methods pertaining to lotteries, games, and sweepstakes. For the purposes of this application, such terms ("lotteries", "games", and "sweepstakes") may be and are used interchangeably, and the use of one term is not intended to exclude the others from its scope, absent an explicit identification of an intent to do so (if any). Therefore, a new technology or ticket described with respect to a "lottery", for example, is equally applicable to a "game" or "sweepstake", unless otherwise specifically stated.

These needs in the arts include, for example, a need for new lottery or game types which elicit greater participation by lottery contestants. As other examples, there is a need for lottery (or game) types with reduced environmental impact and/or which are less expensive and cumbersome to administer. Furthermore, there is a need for lottery or game types which permit or allow the monitoring of individual ticket purchase (or other lottery or game participation) habits as well as entrant demographics (e.g., to permit or at least aid in government regulation or legal compliance of lotteries). As a final but non-limiting example, there is a need for lotteries or games which can be administered quickly and without requiring significant advance preparation or planning. For example, it would be desirable to have a game (or sweepstakes or lottery) which could be administered contemporaneously with a live event, such as a sporting match or a music performance.

In view of the above-enumerated drawbacks and/or needs or desires for improvements in the arts, it is a purpose of the herein described invention to address one or more of such drawbacks and/or desires as well as, or in the alternative, other needs which will become more apparent to the skilled artisan once given the present disclosure.

SUMMARY OF CERTAIN EMBODIMENTS OF THE INVENTION

Generally speaking, certain embodiments of this invention relate to unique games, lotteries, and/or sweepstakes. In other embodiments of this invention, tickets, systems, technologies, and/or methods related to games, lotteries, and/or sweepstake are provided. As already explained above, the terms "games", "lottery", or "sweepstakes" (whether used in the singular or plural) are used interchangeably unless otherwise indicated.

In one non-limiting embodiment of the invention, a unique lottery ticket is provided which is comprised of a digital image (or video images or video sequences or footage) submitted by a lottery contestant in association with payment for participation in the lottery (although payment is not required in each of the embodiments of the invention). Such digital image (or images) may preferably be combined with contestant related data, such as a contestant name, address, phone number, and/or payment information and encrypted and/or compiled and/or combined as an information capsule which serves as a digital lottery ticket (noting, of course, that neither the creation of an information capsule or the encryption step are required in any particular embodiment). The term "digital image" (whether used in the singular or plural) is hereby defined, for the purposes of construing the entirety of this application, as broadly including still images as well as moving images, sequences of images, video images, and/or video footage. Although an encryption step (or other data/information securitization step) is employed in certain embodiments in which an information capsule is created to serve as a lottery ticket, it is recognized that not all embodiments of the invention will employ such a step or steps i.e., just as with the optional creation of the information capsule, an encryption step is not required in any embodiment although it may be used in any embodiment. Moreover, in embodiments which do employ such a step or steps, the encryption may or may not take place simultaneous with the creation of the information capsule e.g., it may also take place before or after the information capsule is created (if an information capsule is created at all, in a particular embodiment). In certain non-limiting embodiments, however, the encryption step or steps simultaneously create the lottery ticket (e.g., as an information capsule) to be used in the lottery and provide security to the data or information encrypted.

In another non-limiting embodiment, a lottery method is provided comprising the steps of:

a lottery contestant electronically submitting a digital image and payment for lottery participation;

electronically encrypting said digital image and contestant information to form an information capsule comprising a lottery ticket;

entering said lottery ticket into a batch of a plurality of other lottery tickets comprised of information capsules;

selecting a lottery ticket from said batch of a plurality of lottery tickets and designating such lottery ticket as a winning ticket of said lottery;

decrypting said information capsule comprising said winning lottery ticket and obtaining information about the lottery contestant which submitted said winning ticket from said decrypted information capsule.

In the same or in different embodiments, prior to the step of selecting and designating a winning ticket, an additional step (or steps) is performed comprising selecting a subset number of said plurality of lottery tickets which is less than the total number of said plurality of lottery tickets and designating said subset number of selected lottery tickets as winners of an intermediate stage of said lottery.

In an alternative and non-limiting, example embodiment, a lottery system for administering a lottery is provided comprising the steps of:

a) a lottery contestant electronically submitting a digital image and payment for lottery participation;
b) electronically encrypting said digital image and contestant information to form an information capsule comprising an lottery ticket;
c) generating a random entry number and affiliating said random entry number with said lottery ticket;
d) repeating steps a), b), and c) such that a plurality of lottery tickets are formed and a plurality of random entry numbers are generated and affiliated with said plurality of lottery tickets;
e) randomly selecting a random winner number in a winner selection phase and matching said random winner number with one of said plurality of random entry numbers to thereby determine a winning ticket of said lottery; and
f) decrypting said information capsule comprising said winning lottery ticket and obtaining information about the lottery contestant which submitted said winning ticket from said decrypted information capsule.

In the same, similar, or in alternative embodiments of that embodiment described immediately above, prior to step e), additional steps are performed comprising: randomly selecting a plurality of random advancement numbers in a lottery advancement phase, said plurality of random advancement numbers being of a quantity which is less than the total number of said plurality of lottery tickets; and matching said plurality of random advancement numbers with corresponding numbers among said plurality of random entry numbers to thereby determine a subset identity of lottery tickets as winners of an intermediate, advancement stage of said plurality of random advancement numbers being of a quantity which is less than the total number of said plurality of lottery tickets; and matching said plurality of random advancement numbers with corresponding numbers among said plurality of random entry numbers to thereby determine a subset identity of lottery tickets as winners of an intermediate, advancement stage of said lottery.

In another non-limiting, example embodiment, a lottery system for administering a lottery is provided comprising the steps of:

a) a lottery contestant generating or creating a digital image for use as a lottery ticket;
b) generating an entry number and affiliating the entry number with the lottery ticket;
c) repeating steps a) and b) such that a plurality of lottery tickets are formed and a plurality of entry numbers are generated and affiliated with the plurality of lottery tickets; and
d) randomly selecting a winning ticket number in a winner selection phase and matching the winning ticket number with one of the plurality of entry numbers to thereby determine a winning ticket of the lottery.

In certain embodiments of the invention, a lottery contestant performs the encryption step to form an information (or data) capsule comprising a lottery ticket (e.g., or performs an information capsule generation step at a different time of or even without the use of an encryption step). In such embodiments, the lottery contestant might use a computer or a mobile electronic device such as a mobile phone to complete such encryption step (or information capsule formation step, alone or together with an encryption step). For example, a software application may be provided for computing devices or mobile phones which can be used by contestants to perform the encryption and/or information capsule formation step(s). Such software may be offered as a download or shipped pre-installed on certain devices, for example. In other embodiments, however, the encryption and/or information capsule formation step(s) are performed by lottery servers, lottery equipment, lottery agents or administrators (e.g., or other third parties), such as after receipt of a digital image, payment, and/or contestant information from a lottery contestant, for example.

In yet additional example embodiments of the subject invention, combined with one or more of the embodiments described above or elsewhere herein, one or more versions of the herein described lotteries and/or methods are integrated into or with one or more of the group consisting of: a television show, web broadcast, website, mobile device broadcast, or software generated graphical user interface.

In still further alternative embodiments at an intermediate stage, images of intermediate stage winners are displayed on a television show, web broadcast, website, mobile device broadcast, or software generated graphical user interface. In such or other embodiments, when a final, single winning ticket is selected, the image submitted by the winning contestant is displayed or broadcast on a television show, web broadcast, website, mobile device broadcast, or software generated graphical user interface.

In at least one non-limiting embodiment, therein is provided a gaming method comprising the steps of: a gaming participant electronically submitting a digital image as well as participant information, for game participation; electronically encrypting said digital image and participant information to form an information capsule comprising a gaming ticket; entering said gaming ticket into a batch of a plurality of other gaming tickets comprised of information capsules; selecting a gaming ticket from said batch of a plurality of gaming tickets and designating such gaming ticket as a winning ticket of said game; and decrypting said information capsule comprising said winning gaming ticket and obtaining information about the gaming participant which submitted said winning ticket from said decrypted information capsule. While in this embodiment, payment from the gaming participant is not required, payment may be collected from other sources such as a gaming sponsor. For example, if a game is administered at a sporting event, a sponsor may pay for the operation of the game, the prize awarded in the game, or other expenses so that gaming participants (e.g., ordinary people attending the sporting event) do not have to pay for participating in the game, but nevertheless may win a prize or prizes as a result of their participation. Sponsors, in turn, may receive brand exposure—as just one example—in return for their financial contributions to the game. For example, in addition to possibly "advertising" or displaying the sponsor's name in association with the game, in at least one embodiment, sponsors may send advertisements or coupons or may otherwise market directly to participants in the games (e.g., via MMS or SMS, email, etc.), This financial structure, while useful in this embodiment, may be employed in other embodiments described in this application alone, or in combination with other financial structures or payment options. Additional embodiments related to spectator events, live events, sporting events, music performances, trade shows and the like—which may or may not include participant payment and which may or may not include sponsor participation—are described herein-below.

In another non-limiting embodiment, a game is provided in which it is free for players to participate. In such an embodiment, a digital image, such as a digital photograph, is sent to the game administrator (e.g., to its communication and data storage networks) via MMS or other similar method from a smart phone-type device. At an event, such as a sporting event (e.g., a football or basketball game or ski competition), which employs large electronic display screens, the submitted photos—which may serve as the tickets themselves—can be displayed or alternated on the screens so that spectators at the event can view the photos during the game. In conjunction with such displays of the photos, a random (or other type) drawing of an entrant's photograph can be depicted on the screens. Afterwards, prizes can be awarded, or at least announced, for the winner or winners drawn in the game. These prizes can be provided by game sponsors, for example.

By way of more specific example, in at least one embodiment of the game described immediately above, potential game participants at live events (e.g., football game attendees) see an advertisement on stadium screens and through such advertisements in the stadium, they are invited to enter into a competition or game to win a prize. Rather than charge a gaming fee for entry into the game or contest, wishful participants can simply send a photograph to an identified "short code" (or to a phone number or email address, for example) by the invited method, i.e., via conventional MMS message, for example. Entry is free, other than the standard carrier data costs charged to send an MMS. At some later time during the event, the screens will display the selection process of the prize winner or winners. For example, in at least one embodiment, the photographs of the entrants may be displayed in a photo carousel or on a spinning photo-wheel, displaying numerous entrant photographs, that spins around and stops at the winning photograph. In at least one envisioned embodiment, a sponsor or sponsors of the games can structure the game so that participants are sent a link to a social networking page (e.g., to a Facebook page) or to an internet web-page where they can see their photographs combined with logos representative or associated with the events they attended and/or the sponsors of the game. It is also contemplated that in some of such embodiments (but not all of such embodiments) that a game sponsor's name and/or logo will be featured or otherwise displayed on the stadium screens and/or also in the confirmation messages participants receive on their mobile phones or similar communications devices. Of course, coupons (or other redeemable certificate types), advertisements, and/or other marketing information or participation rewards may also be sent. Similarly, surveys (or other sponsor related inquiries) could be sent, for example, with rewards or other compensation possibly provided to the participants which actually complete the surveys.

In at least one other embodiment useful in conjunction with spectator and other live event types, a gaming method is provided comprising the steps of: displaying an invitation to play a game at a spectator event; employing a network, including data transmission and storage mechanisms, for a gaming contestant to electronically submit a digital image for game participation; entering the digital image into an electronic batch of a plurality of other digital images; and selecting a digital image from the electronic batch of a plurality of digital images and designating such selected digital image as a winning entry of the game.

In still additional embodiments, moderators are used to manually review digital images submitted for processing as lottery tickets and to approve or disapprove images for broadcast or publication. In certain non-limiting embodiments, during moderation steps or when moderators are otherwise being used, if a digital image is disapproved, an alternate image is substituted for the disapproved image and is assigned to the lottery ticket associated with said disapproved image, and said alternate image is utilized for broadcast or publication.

In at least one example embodiment, a lottery system is provided in which a number is generated in association with each electronic lottery ticket entered into a batch of a plurality of lottery tickets and is logged, and the number is used in performing intermediate stage winner selection or final winner selection steps. In a similar or alternative embodiment, intermediate stage winner selection or final winner selection steps are performed utilizing a random number generator to randomly generate numbers which are matched to logged numbers, generated in association with lottery tickets being entered into said batch, to thereby select intermediate stage winners and/or a final lottery winner.

In at least one non-limiting embodiment, images submitted to be processed as and/or converted into lottery tickets are taken and/or submitted using a mobile electronic device such as a cellular telephone or handheld computing device. In other embodiments, digital images may be taken and submitted via a publically accessible kiosk (e.g., located on the street or in a convenience store). In still other embodiments, digital images may be submitted via a computer using an internet connection (e.g., regardless of whether such images are taken by a camera resident in or connected to such a computer or are uploaded to a computer via a conventional camera or scanning device). In further embodiments, images may be obtained from third party sources or originally authored such as via software.

In certain example embodiments which should be construed as non-limiting, payment for lottery participation may be submitted via use of a prepaid SIM card. Other mechanisms for payment include, but are not limited to, cash or check, personalized payment accounts such as merchant accounts or PAYPAL type accounts (or other proprietary account types) or credit card payments (where legal) such as via the internet, or by electronic transfer of cryptocurrency such as Ethereum or Bitcoin. Other payment methods may, of course, be used, which may include recurring payment types. Care should be taken, of course, to comply with local laws pertaining to the legality of acceptable payment types for lottery ticket purchases or other lottery participation type. Payments may be made on a per ticket basis at the time of lottery ticket purchase or submission or at other times as may be contemplated by those of skill in the art (and may be made in association with single, multiple ticket or batch ticket purchases, for example). In certain (but not all) embodiments, it is preferred that payment be completed before or with ticket purchase or digital image submission.

Likewise, a lottery prize may consist of a cash payment to a lottery winner. Mechanisms for prize payout include transfer of credit to the lottery winner's prepaid SIM card, transfer of funds to a personalized account such as PAYPAL or Venmo (or other proprietary account types), transfer of payment by credit card, or by electronic transfer of cryptocurrency such as Ethereum or Bitcoin. Other payment methods may, of course, be used, such as cash payments or a check.

In certain (but not all) embodiments of the invention, it is an object to provide a more instant gaming experience to the lottery participant. For example, in such embodiments, the time span between the actual purchase of the ticket and the draw can be shortened dramatically, and theoretically down to one hour, as opposed to traditional lotteries that operate with a "waiting period" of up to a week.

In the same or alternative (but not all) embodiments, lottery tickets are personalized (e.g., via use of submitted images) and therefore provide a more engaging experience for the lottery participants (e.g., which may encourage participation or loyalty with the lottery). In certain exemplary embodiments, the winning tickets and/or tickets which advance to intermediate stages (prior to the final stage of the lottery) will be shown on television or displayed in some other public format (e.g., such as on the internet). Moreover, in some embodiments, the image that becomes representative of the lottery ticket (e.g., and which is displayed on television) is an image that displays what the ticketholder or participant chooses (for instance a personal or family or pet photo).

Although numerous game, sweepstakes, and/or lottery entry methods have been described herein—including entry by MMS message, for example—many other forms of entry can be used in the herein described embodiments (whether alone or in combination with other entry methods or mechanisms). For example, some other forms of entry include electronic mail (i.e., email), smart phone software applications, and/or use of social media or networking sites (e.g., LinkedIn™, Facebook™, and Twitter™). For example, a game, lottery, or sweepstakes produced in accordance with an inventive embodiment described herein can be linked or connected to a social networking site such that it mines or accesses data or images from the site to use as entry data (e.g., a profile photograph from a site like Facebook™ might be captured and used as a game entry photograph). In still other embodiments, representatives of a lottery, game, or sweepstake can be employed to take pictures of game entrants and then use them to register or enter people into the games (or sweepstakes or lottery).

Although hashtags (i.e., the symbol "#") are normally used in technology forums, such as on social media platforms, to index, organize, and/or aggregate content affiliated or "marked" with the hashtag, at least one embodiment of this invention provides a system or method for entering a sweepstakes (or optionally a lottery) using such a hashtag. In at least one such embodiment, an individual desiring to enter a sweepstakes event (or sweepstakes-type event or raffle) takes or selects a photograph (or image or video) and posts the photograph to a social media-type platform in affiliation with a hashtag (i.e., the "#" symbol, typically followed by a word or phrase). For example, the photograph might be posted on twitter affiliated with the "hashtagged" word "photoentry" (or, in other words, "#photoentry"). The entity administering the sweepstakes-type event can select any word or phrase to be hashtagged, of course, but the word or phrase selected is preferably unique so that the sweepstakes objectives can be accomplished efficiently. After a plurality of sweepstakes entrants enter the sweepstakes, as described, the social media site which is being utilized in connection with the sweepstakes is polled or mined or "scraped" for entrants, preferably by searching for the selected hashtagged entry term or phrase (e.g., "#photoentry"). Alternatively, if the sweepstakes operator controls (or has adequate control of or is granted access to) the social media platform, the hashtagged term or phrase can operate as an affirmative command to the platform (e.g., similar to a software command like "run") to enter the photograph into the sweepstakes substantially concurrent to the hashtagged term (or phrase) being posted. In such embodiments, the sweepstakes entry process is preferably automated via software, but other embodiments where the hashtagged entries are collected manually are also contemplated. Once an adequate number of sweepstakes entrants have entered the sweepstakes, a sweepstakes drawing is displayed, in some form, on the social media site, or on publicly viewable screens, such as a jumbotron at a concert or sports venue. For example, a sweepstakes winner may be selected by selecting a photo-entrant, as described elsewhere herein, and then the sweepstakes winner announced by displaying the winning entrant's photograph (or image or video) on the social media site or screen (e.g., a jumbotron). Although preferred embodiments allow free sweepstakes entries, payment may also be required for entry in alternative embodiments. Additionally, the social media-type platform which is utilized may be an existing platform (e.g., such as Facebook, twitter, Instagram, Pinterest, Linkedin, etc.), however, a unique or even temporary social media platform may also be created by the sweepstakes provider. For example, a cloud-based platform may be created or hosted for access by existing jumbotrons (or other similar-type screens) at a concert or sporting or political event. Access may be provided by allowing access to the cloud-based platform (or to sweepstakes controlled servers hosted remotely) by existing computer processing devices (e.g., servers) which already exist at the event venue. Alternatively, access can be provided by servers, with pre-installed software, delivered to the venue for the purposes of administering the sweepstakes at the event.

In another non-limiting embodiment, an alpha-based, or alpha-numeric, lottery is provided. In one such example lottery, a player is permitted to choose lottery letters or words or sentences, in place of a number offered in a conventional lottery. Optionally, there a database is provided in such embodiments so that a player can verify that the words being chosen are viable lottery play options. For example, certain taboo words will be omitted in preferred iterations. In other instances, words may not contain sufficient numbers of characters to be viable lottery plays. In one embodiment, the lottery is preferably two stage: in the first stage, a number is chosen which determines the number of letters that will be utilized in the lottery draw. For example, if the number fourteen is selected in the first state, then lottery entrants may choose words and/or sentences having fourteen alpha-characters for entry into the subsequent alphabet phase of the lottery. Alternatively, a player is provided a guessing opportunity and must correctly guess a number (e.g., either pre-selected or drawn post entry) in order to move to the second lottery stage where a word or sentence chosen by the advancing lottery player must match the "drawn" word or sentence in order to win the lottery. In preferred (but still optional) embodiments, words or sentences for play are chosen and paid for on a per letter basis. In one such example, the more alphabet letters involved in the lottery (e.g., chosen and entered), the higher the prizes available (and vice versa). In similar preferred embodiments, words or sentences are selected by the lottery provider as winning words or sentences using an algorithm which randomly selects the words/sentences from a database. Such lotteries are preferably played on a phone/mobile application, or on a computer, utilizing electronic payment (e.g. credit card, etc.) for entry.

In at least one alpha-numeric lottery example, a lottery ticket is provided which is comprised of a set of numbers, ranging from 0 to 9 and/or letters, ranging from A to Z submitted by a lottery contestant in association with payment for participation in the lottery (hereinafter "The Numbers"). The Numbers may preferably be combined with contestant related data, such as a contestant name, address, phone number, and/or payment information and encrypted and/or compiled and/or combined as one or more information capsules which serves as a digital lottery ticket. The term "The Numbers" (whether used in the singular or plural) is hereby defined, for the purposes of construing the entirety of this application, as broadly including digits as well as letters, both in lower case and capitals. Although an encryption step (or other data/information securitization step) is employed in certain embodiments in which an information capsule is created to serve as a lottery ticket, it is recognized that not all embodiments of the invention will employ such a step or steps. Moreover, in embodiments which do employ such a step or steps, the encryption may or may not take place simultaneous with the creation of the information capsule e.g., it may also take place before or after the information capsule is created. In certain non-limiting embodiments, however, the encryption step or steps simultaneously create the lottery ticket (e.g., information capsule) to be used in the lottery and provide security to the data or information encrypted.

In another non-limiting embodiment, a lottery method is provided comprising the steps of:

a lottery contestant electronically submitting The Numbers and payment for lottery participation;

electronically encrypting The Numbers and contestant information to form one or more information capsule comprising a lottery ticket;

entering said lottery ticket into a batch of a plurality of other lottery tickets comprised of information capsules;

selecting a lottery ticket from said batch of a plurality of lottery tickets and designating such lottery ticket as a winning ticket of said lottery if The Numbers contained in said ticket match that of a lottery draw;

decrypting said information capsule comprising said winning lottery ticket and obtaining information about the lottery contestant which submitted said winning ticket from said decrypted information capsule.

In the same or in different embodiments, prior to the step of selecting through a process of drawing random numbers and of letters and designating it a winning ticket, an additional step (or steps) is performed comprising selecting a subset number of said plurality of lottery tickets which is less than the total number of said plurality of lottery tickets and designating said subset number of selected lottery tickets as winners of an intermediate stage of said lottery.

In an alternative and non-limiting, example embodiment, a lottery system for administering a lottery is provided comprising the steps of:

a) a lottery contestant electronically submitting The Numbers and payment for lottery participation;

b) electronically encrypting said digital numbers and/or letters and contestant information to form an information capsule comprising an lottery ticket;

c) generating a random entry number and affiliating said random entry number with said lottery ticket;

d) repeating steps a), b), and c) such that a plurality of lottery tickets are formed and a plurality of random entry numbers are generated and affiliated with said plurality of lottery tickets;

e) randomly selecting a random winner number in a winner selection phase and matching said random winner number with one of said plurality of random entry numbers to thereby determine a winning ticket of said lottery; and f) decrypting said information capsule comprising said winning lottery ticket and obtaining information about the lottery contestant which submitted said winning ticket from said decrypted information capsule.

In the same, similar, or in alternative embodiments of that embodiment described immediately above, prior to step e), additional steps are performed comprising: randomly selecting a plurality of random advancement numbers in a lottery advancement phase, said plurality of random advancement numbers being of a quantity which is less than the total number of said plurality of lottery tickets; and matching said plurality of random advancement numbers with corresponding numbers among said plurality of random entry numbers to thereby determine a subset identity of lottery tickets as winners of an intermediate, advancement stage of said lottery.

In another non-limiting, example embodiment, a lottery system for administering a lottery is provided comprising the steps of:

a) a lottery contestant generating or creating digital numbers and/or letters for use as a lottery ticket;

b) generating an entry number and affiliating the entry number with the lottery ticket;

c) repeating steps a) and b) such that a plurality of lottery tickets are formed and a plurality of entry numbers are generated and affiliated with the plurality of lottery tickets; and d) randomly selecting a winning ticket number in a winner selection phase and matching the winning ticket number with one of the plurality of entry numbers to thereby determine a winning ticket of the lottery.

In certain embodiments of the invention, a lottery contestant performs the encryption step to form an information (or data) capsule comprising a lottery ticket (e.g., or performs an information capsule generation step at a different time of or even without the use of an encryption step). In such embodiments, the lottery contestant might use a computer or a mobile electronic device such as a mobile phone to complete such encryption step (or information capsule formation step, alone or together with an encryption step). For example, a software application may be provided for computing devices or mobile phones which can be used by contestants to perform the encryption and/or information capsule formation step(s). Such software may be offered as a download or shipped pre-installed on certain devices, for example. In other embodiments, however, the encryption and/or information capsule formation step(s) are performed by lottery servers, lottery equipment, lottery agents or administrators (e.g., or other third parties), such as after receipt of a digital numbers and/or letters, payment, and/or contestant information from a lottery contestant, for example.

In yet additional example embodiments of the subject invention, combined with one or more of the embodiments described above or elsewhere herein, one or more versions of the herein described lotteries and/or methods are integrated into or with one or more of the group consisting of: a television show, web broadcast, website, mobile device broadcast, or software generated graphical user interface.

In still further alternative embodiments at an intermediate stage, numbers and/or letters of intermediate stage winners may be displayed on a television show, web broadcast, website, mobile device broadcast, or software generated graphical user interface. In such or other embodiments, when a final, single winning ticket drawn, by matching the numbers and/or letters submitted by the winning contestant is displayed or broadcast on a television show, web broadcast, website, mobile device broadcast, or software generated graphical user interface.

In still additional embodiments, moderators are used to manually review digital numbers and/or letters submitted for processing as lottery tickets and to approve or disapprove numbers and/or letters for broadcast or publication. In certain non-limiting embodiments, during moderation steps or when moderators are otherwise being used, if a digital numbers and/or letters is disapproved, an alternate numbers and/or letters is substituted for the disapproved numbers and/or letters and is assigned to the lottery ticket associated with said disapproved numbers and/or letters, and said alternate numbers and/or letters is utilized for broadcast or publication.

In at least one example embodiment, a lottery system is provided in which a number is generated in association with each electronic lottery ticket entered into a batch of a plurality of lottery tickets and is logged, and the number is used in performing intermediate stage winner selection or final winner selection steps. In a similar or alternative embodiment, intermediate stage winner selection or final winner selection steps are performed utilizing a random number generator to randomly generate numbers which are matched to logged numbers, generated in association with lottery tickets being entered into said batch, to thereby select intermediate stage winners and/or a final lottery winner.

In at least one non-limiting embodiment, numbers and/or letters submitted to be processed as and/or converted into lottery tickets are taken and/or submitted using a mobile electronic device such as a cellular telephone or handheld computing device. In other embodiments, digital numbers and/or letters may be taken and submitted via a publicly accessible kiosk (e.g., located on the street or in a convenience store). In still other embodiments, digital numbers and/or letters may be submitted via a computer using an internet connection (e.g., regardless of whether such numbers and/or letters are taken by a camera resident in or connected to such a computer or are uploaded to a computer via a conventional camera or scanning device). In further embodiments, numbers and/or letters may be obtained from third party sources or originally authored such as via software.

In certain example embodiments which should be construed as non-limiting, payment for lottery participation may be submitted via use of a prepaid SIM card. Other mechanisms for payment include, but are not limited to, personalized payment accounts such as merchant accounts or PAYPAL type accounts (or other proprietary account types) or credit card payments (where legal) such as via the internet. Other payment methods may, of course, be used. Care should be taken, of course, to comply with local laws pertaining to the legality of acceptable payment types for lottery ticket purchases or other lottery participation type. Payments may be made on a per ticket basis at the time of lottery ticket purchase or submission or at other times as may be contemplated by those of skill in the art (and may be made in association with single, multiple ticket or batch ticket purchases, for example). In certain (but not all) embodiments, it is preferred that payment be completed before or with ticket purchase or digital numbers and/or letters submission.

In certain (but not all) embodiments of the invention, it is an object to provide a more instant gaming experience to the lottery participant. For example, in such embodiments, the time span between the actual purchase of the ticket and the draw can be shortened dramatically, and theoretically down to one hour, as opposed to traditional lotteries that operate with a "waiting period" of up to a week.

In the same or alternative (but not all) embodiments, lottery tickets are personalized (e.g., via use of submitted numbers and/or letters) and therefore provide a more engaging experience for the lottery participants (e.g., which may encourage participation or loyalty with the lottery). In certain exemplary embodiments, the winning tickets and/or tickets which advance to intermediate stages (prior to the final stage of the lottery) will be shown on television or displayed in some other public format (e.g., such as on the internet). Moreover, in some embodiments, the numbers and/or letters that becomes representative of the lottery ticket (e.g., and which are displayed on television) are numbers and/or letters that displays what the ticketholder or participant has chosen.

In some of the above or other embodiments, there is provided a system and/or method to be used or integrated with lotteries, such as described in the example embodiment(s) below:

Interstate Player Registration (e.g., in the United States)

The following is a description of a system or method for preventing the following, negative consequences of gambling, such as: gambling addiction; lack of age control; the player losing his/her ticket; theft of tickets; pollution (paper tickets). In one or more of such embodiments, the player must, before participating in a game of chance, supply two or more of the following: full name; address; phone number; debit card number; credit card number; email address; social security number; date of birth; and/or bank account number. The information is optionally, but preferably, provided by the participant via a mobile phone application or via a website. After the information is sent to the database, it is cross referenced with other sources of information (e.g., driver license information, IP address, encryption token) to ensure that the identity of the participant is correct and that the participant is of legal gambling age. Each participant can preferably only have one player profile. The participant can then, via the participant's credit or debit card, participate in games of chance.

If the participant wins, the winnings will be transferred directly to the participant's bank account and or credit or debit card. The participant is issued a receipt and the database retains a copy of the receipt or transfers it to a second database. If the participant spends more money than he or she should, the participant will be locked out of the game for a period of time. This will be defined by either the participant's own spending limits or built-in spending limits. The participant can choose to delete or deactivate his/her profile.

In some of the above or other embodiments, there is also provided a unique lottery, in which electronic payment is accepted (e.g., credit card payment). In such a lottery, lottery play is monitored so that frequent players can be identified. If players play too often, they can be warned and/or play suspended for selected times. Frequency of play acceptability can be the same criteria for all players, or based on salary and/or credit history. A more specific embodiment, and other criteria, are described below:

Additional Example of Lottery Summary:

In one preferred but optional embodiment, a player is permitted to choose lottery letters or words or sentences, in place of a conventional number based lottery. In preferred embodiments, there is a database so that a player can verify that the words being chosen are viable play options. For example, certain taboo words will be omitted in preferred iterations, as may be slang or fake words, for example. The lottery is preferably delivered in two stages, as follows: in the first stage, a number is chosen which determines the number of letters that will be in the lottery. Optionally, in an alternative embodiment, a player must correctly guess the number in order to move to the second lottery stage where a chosen word or sentence must match the "drawn" word or sentence in order to win the lottery. In yet another optional embodiment, staged prizes for winning first and second stages may be offered. Words or sentences for play are preferably offered and/or chosen and paid for on a per letter basis. The more letters chosen and entered, the higher the prizes available (and vice versa), in preferred embodiments. Words or sentences are preferably thereafter selected by the lottery provider as winning words or sentences using an algorithm which randomly selects the words/sentences from a database. The lottery is preferably played on a phone/mobile application with electronic payment (e.g. credit card, etc.).

In the same or other (but not necessarily all) embodiments, the inventions described herein can be utilized while mitigating gambling related social issues. For example, certain of the technologies described herein enable the lottery provider or administrator to monitor the revenue generated by each individual participant or ticketholder (e.g., by monitoring the frequency or quantity of ticket purchases). This allows entities to consequently regulate the individuals gaming habits to, for example, prevent excessive gambling. In such embodiments, the lottery provider or administrator can, for example, maintain a profitable business and generate revenue for its charities, governments, and beneficiaries, etc. while avoiding significantly contributing to the social issues of gambling addiction.

Similarly, certain (but not all) of the technologies described herein can aid in compliance with and enforcement of laws and other governmental regulations (or even contractual obligations) related to lotteries. For example, because of the electronic nature of the lottery tickets described herein, regulatory entities (e.g., governments) can prevent excessive ticket sales utilizing computerized control. For example, such controls can be used to prevent more tickets from being sold or issued than the operator is permitted or for which the provider or administrator is otherwise licensed. Still further, certain (but not all) of the embodiments of the technologies described herein provide for increased ability to evaluate and/or analyze lottery transactions. For example, such embodiments may provide entities (e.g., governmental authorities) with an increased ability to investigate or evaluate suspicious transactions and/or trace transaction origins, thereby allowing for possible prevention of illegal activity such as money laundering.

In at least one embodiment, to aid such compliance monitoring and/or enforcement, or for other purposes, a database is provided which is comprises of data collected during the operation and/or in the administration of there herein described lotteries. For example, in at least one example embodiment, there is provided: a first database optionally utilized to automatically track the gaming patterns of separate individuals, the database being comprised of data collected from payment information submitted for each entrant, or from name or identification information submitted by each entrant. In similar useful embodiments, a second database of known or suspected abusers or money launderers is also maintained. In such embodiments, the servers are configured, and/or the software is programmed, to compare the data in the first database to the data in the second data base to identify money launderers or players with abusing playing habits or gambling problems.

Certain examples of the invention are now described below with respect to certain non-limiting embodiments thereof as illustrated in the following drawings wherein:

DETAILED DESCRIPTION OF CERTAIN EMBODIMENTS

For a more complete understanding of the present invention, reference is now made to the following description of various illustrative and non-limiting embodiments thereof, taken in conjunction with the accompanying drawings in which like reference numbers indicate like features.

Addressing one or more of the above-described drawbacks or needs in the lottery arts (or other drawbacks or needs not specifically described herein), at least one embodiment of the subject invention comprises a unique lottery ticket comprised of a photograph or other digital image submitted by a contestant in combination with payment for lottery participation. Such an image and/or payment information is compiled and/or encrypted to form a secure information capsule which serves as a lottery ticket. When such a capsule is encrypted, the information contained in the lottery ticket (including the identity of the contestant, the image, and possibly other information) is secured from unauthorized access and therefore aids in preventing tampering with lottery integrity. Because numerous other types of information may be provided in connection with a digital image (e.g., at the time of purchase of lottery participation), such as a contestant's name, address, phone number, sex, birth date, date/time of ticket purchase, etc., such categories of information, including payment information, are periodically referred to herein as, and are intended within the scope of this document to be, synonymous with the term "contestant information".

Figure 1:
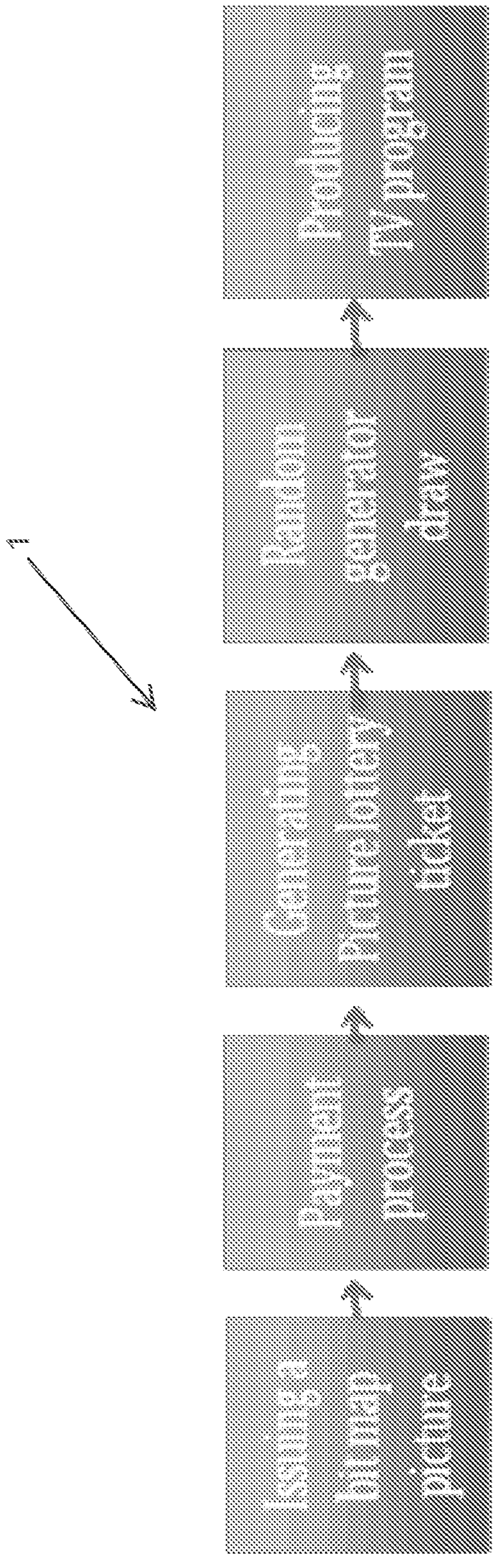
FIG. 1 schematically illustrates one embodiment of an example lottery system according to the subject invention.

Referring now to FIG. 1, a non-limiting, example embodiment of a lottery system which utilizes such a lottery ticket (e.g., comprised of a digital image and contestant information compiled or encrypted to form an information capsule) is schematically depicted therein. Generally speaking, such a lottery system 1 includes five main stages or phases which begin with entry of a contestant into the lottery and terminate with the selection of a lottery winner and the broadcast or publication of such lottery winner on a television program, webcast, website, or the like.

More specifically, the lottery begins with phase 1 where the prospective lottery contestant submits a digital image to the lottery provider. Such digital image may be taken or captured using a cellular phone (with a built-in camera) or may be taken with a conventional camera and then uploaded to a computer or cellular phone for submission. Similarly, a scanner may be used to create a digital image or an image may simply be obtained from third party sources or even authored via software programs such as Adobe Acrobat, Photoshop, or Microsoft's Paint application. In still another example, lottery kiosks may be provided in public locations, such as grocery or convenience stores, with such kiosks including cameras and appropriate data or internet connections for capturing and submitting digital images. Regardless of how the image is created or captured (and regardless of the type of image file which is employed, for example, a ".bmp" or ".jpg" or ".tiff" type file), the image is ultimately submitted to the lottery provider or administrator using suitable methods or mechanisms. These may include, but are not limited to, via MMS message, internet (e.g., via email), proprietary software interface (e.g., contained or downloaded onto a computer, hand held device, or mobile phone), or via the above-described kiosk, for example. In at least one embodiment (not intended to be limiting to the invention), once an image is submitted to the lottery provider, the image is stored on lottery servers in association with a unique user profile linked or associated with the lottery contestant (e.g., created simultaneous with, prior to, or after the submission of a suitable image).

Certain embodiments may utilize social media or networking sites, such as LinkedIn™ Facebook™, and Twitter™ for entry. In those embodiments one unique method of entry may be accomplished by a participant applying a hashtag or pound sign (#) to a message and posting the message to a social media platform. The hashtag that results in game entry may be defined by an administrator such as an event sponsor, a promoter, or the game provider. For example, the entry hashtag could be defined to be the name of a promoter and could appear as: #PromoterName. In a further non-limiting example, a promoter may desire to promote the name of a product. The promoter is enabled to define the entry hashtag to be a product name. In that case the entry hashtag could appear as: #PromoterProductName. The game, lottery, or sweepstakes system mines or accesses data from the social media platform and may be configured to search for the entry hashtag (alternatively, in some embodiments, the data may be pushed if the hashtag operates as an entry command). This mining may be accomplished by a local or cloud-based network. Upon finding an entry hashtag the game, lottery, or sweepstakes system may enter the corresponding participant into the game, lottery, or sweepstakes.

In phase 2, subsequent or simultaneous with phase 1 (or even prior thereto), a lottery contestant submits payment for lottery participation (e.g., payment for entry into the lottery, issuance of the ticket, and the chance at winning prizes or money). Such payment can be completed using functionalities or services offered by contestants' mobile operators where the owners of the mobile phones (or cellular phones) are charged or billed through their mobile subscription either as a credit, debit, or via deduction from a pre-paid account (e.g., a pre-paid SIM card). Alternative payment options include cyber currency—such as Bitcoin—or may even include conventional cash or check payments. Check payments may be made by scanning or taking photographs of a signed check (or other legal monetary instrument) and then transmitting or uploading to obtained image to the lottery provider or to an authorized bank or other account holder or manager. In still other embodiments, it is envisioned that a participant could be provided with a location to submit a physical, paper check (or other physical currency). This billing or debiting (or at least the recording of the transaction) may occur simultaneous with an MMS image submission to the lottery operator, for example. In other example embodiments, user profiles may be linked to payment services or options such as merchant accounts, credit or debit cards, or PAYPAL type accounts (e.g., such that when an image is submitted to the lottery administrator, payment is automatically completed via payment services linked to the user profile). However payment is made, in exemplary embodiments of the invention, whenever an image is submitted to the lottery provider (or when the lottery provider processes or accepts a submitted image), a valid payment is registered and a lottery ticket purchase (or lottery entry) is fulfilled. Thereafter, in phase 3, the process of creating a picture or image type lottery ticket is begun.

Figure 2:
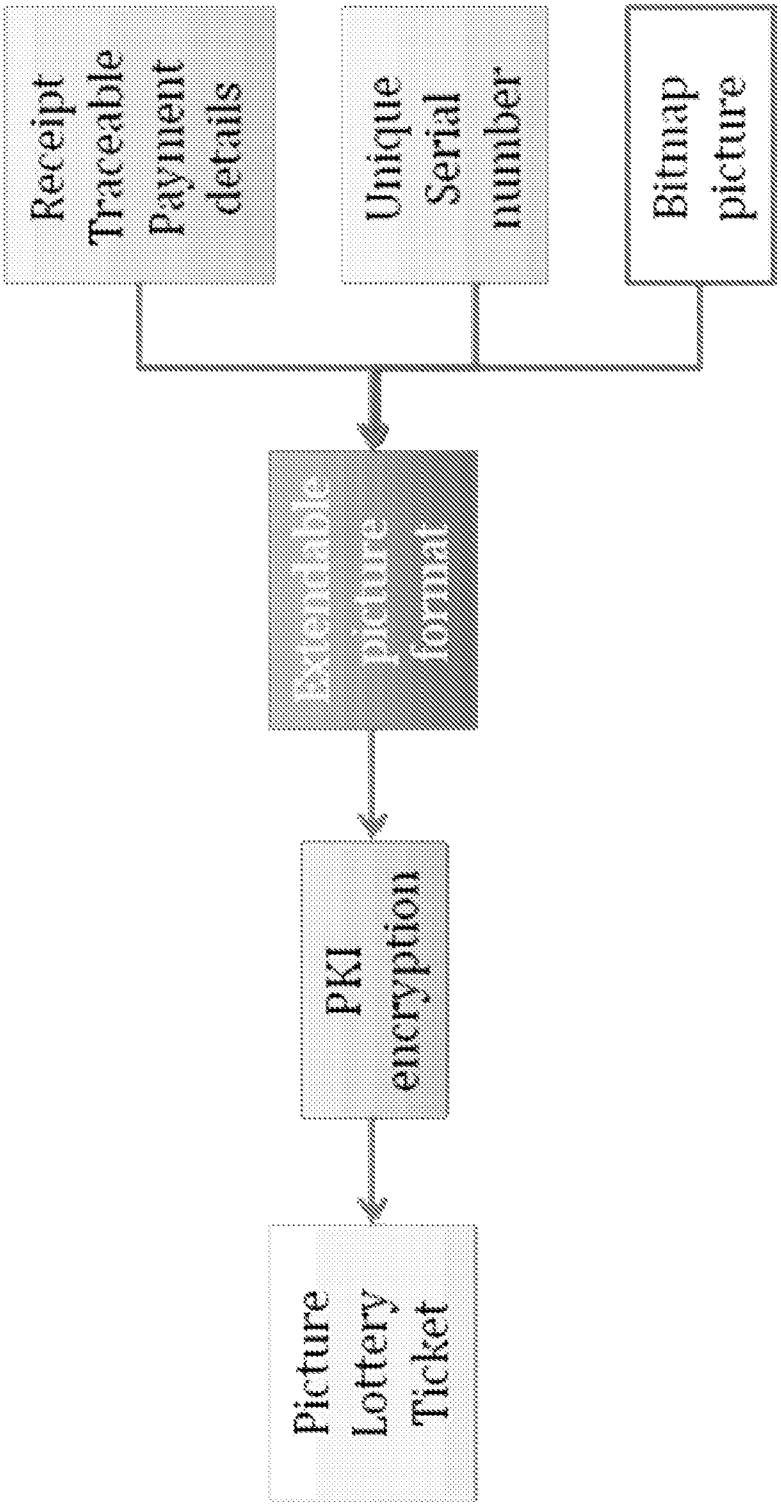
FIG. 2 schematically illustrates one method or process of creating or generating lottery tickets according to one non-limiting embodiment of the subject invention.

In particular, during phase 3, the image file submitted by the lottery contestant is converted into a lottery ticket, as schematically illustrated in FIG. 2, which, optionally, can be used in an existing or conventional lottery process and infrastructure. This conversion, in preferred (but not necessarily all) embodiments, includes a combination or compilation of the digital image with contestant information, which preferably includes payment information, as defined herein above. Generally speaking, each lottery ticket (e.g., created from a digital image, etc.) converted or created results in a self-contained information capsule (e.g., created or stored as a ".lot" file with associated MIME type(s) to process the file), which, in preferred embodiments, carries all (or at least some) information necessary to secure lottery ticket integrity and to re-generate the originally submitted lottery picture or image (and/or contestant information). Further, in at least some embodiments, each information capsule or lottery ticket created will be linked to the users (i.e., image issuer's or lottery contestant's) unique personal profile.

In certain embodiments, when a picture or image is received from an issuer (i.e., a lottery contestant), the lottery provider or administrator charges a fee to convert the image into a lottery ticket. In preferred embodiments, traceable banking information—for example routing numbers or information and/or clearing house numbers—will be integrated in whole or in part into the lottery ticket.

Also (in at least some embodiments) during phase 3, to ensure, among other things, that each lottery ticket has a unique value or identifier, a serial number will be generated and integrated into or associated with the lottery ticket. Such a serial number may be generated randomly or as a result of data provided by the lottery contestant e.g., derived from digital image information and/or contestant information.

In one particularly unique embodiment, a lottery or sweepstakes is provided which utilizes the digital image submitted to generate a unique entry number derived from data present in the digital image. For example, the color patterns or color saturation within the image can be analyzed and unique numbers thereby generated from the unique color patterns or color saturation values found in each image. This can be done in combination with data sets derived also from the number of objects displayed within the image, or from the shape(s) of the objects displayed within the image. Accordingly, because each image (e.g., each personal photograph) submitted will be unique, each entry number derived from the image will be unique. These unique numbers obtained, derived from the qualities of each unique photograph, may be combined with the image and other contestant information to form a digital image lottery ticket for each lottery entrant. Alternatively, the derived data sets can be converted into a unique individual lottery number, sweepstakes number, or serial number to be used as the unique entry identifier itself (preferably still associated with a digital image). In some embodiments, software can be utilized to more quickly evaluate such photo derived entry identifiers for the purposes of most quickly matching the numbers to drawn (or otherwise selected) winning entry numbers, for more efficient winner selection or determination. In certain embodiments of the invention (but not necessarily all embodiments), open source extendable image formats are used for compressing or packing information, but in some cases, non-open source (for example, proprietary) formats will be used. In embodiments in which non-open source or proprietary formats are used, such use may be employed for the purpose of further uniquely identifying images or generated lottery tickets. Such use, in this regard, may provide security or integrity to the lottery system or method by indicating the presence of or by providing necessary lottery information. Although conventional PKI type encryption may be used to encrypt information capsules and/or tickets and/or contestant information (e.g., so that the tickets or information capsules, etc. can only be opened or accessed by authorized persons to thereby provide additional integrity or security to the lottery system), it is contemplated, of course, that other encryption types or methods may be used (or that other data securitization types or methods, exclusive of encryption, may be used) regardless of whether in existence at the time of the present application for patent.

Of course, each of these steps or processes just described related to encryption, compilation of data, and/or otherwise related to the creation of the information capsule or lottery ticket (whether or not encrypted at this stage or later or not at all) may be performed by the lottery contestant rather than the entity administering the lottery (or such entity's equipment or agent), or by some combination thereof. For example, software may be provided either preloaded into computers or mobile devices or made available as downloads (e.g., as an iPhone software application). Alternatively, all of the necessary software may be hosted in "the cloud" to minimize hardware cost, install, and storage requirements. In such cases, the contestant could access the necessary software using a link provided on a mobile device, which is either located by navigating the world wide web or because it is received by email, text message, or other messaging mechanism or type. However provided, and regardless of where hosted or stored (or operated), such software could be used by a lottery contestant to pre-encrypt image and contestant information or to otherwise create a valid, secure lottery ticket (e.g., or information capsule) prior to or simultaneous with submission of such to the entity administering the lottery (whether or not such lottery ticket or information capsule is encrypted, by compiling or combining appropriate data or information).

In phase 4 or the lottery draw phase, a lottery drawing will take place in which lottery entrants will either be selected to advance to intermediate or advancement phases of the lottery and/or a final lottery winner or winners will be selected. In certain example (but non-limiting) embodiments, a lottery draw is conducted utilizing an approved (and preferably secure) random number generator and/or lottery draw machine supplied by one of a number of possible vendors.

In certain but not all embodiments, the draw is completed in several rounds such as "qualification", "advancement", and "final" rounds. In an example of one of such embodiments, a first round is completed or performed to select a plurality of lottery tickets which, as winners of an initial lottery stage (or "qualification draw"), enter or proceed to the next levels or stages of the lottery. In such later stages, further draws are completed which select or determine winners to proceed to additional or a final stage(s). As described in more detail below, one or more (or all) of such draws or levels (e.g., including pictures or images of the contestants advancing) can be broadcast (or integrated into an existing broadcast) on a television program or otherwise publicized such as on a webcast or website. Further, the various levels of draw may be completed or initiated prior to a television broadcast (for example) or, alternatively, as a live component of a television program (e.g., using pre-moderated images or photographs from or comprising the lottery tickets).

In some embodiments of the inventive lottery methods and/or systems where moderation of images or photographs is employed (e.g., because of local laws regulations or ethical standards), the approval or moderation process is conducted by human moderators. More particularly, such moderators will review and adjudge the submitted, selected, or drawn pictures or images to ensure compliance to regulatory and decency issues (i.e., which will typically be different from market to market and from application to application). If a picture is not compliant or is otherwise not acceptable (e.g., as decided by moderators or other mechanism), it can be exchanged or replaced with a dummy placeholder picture or other generic image for use in the associated television program or other form of lottery publication or broadcast.

Figure 3:
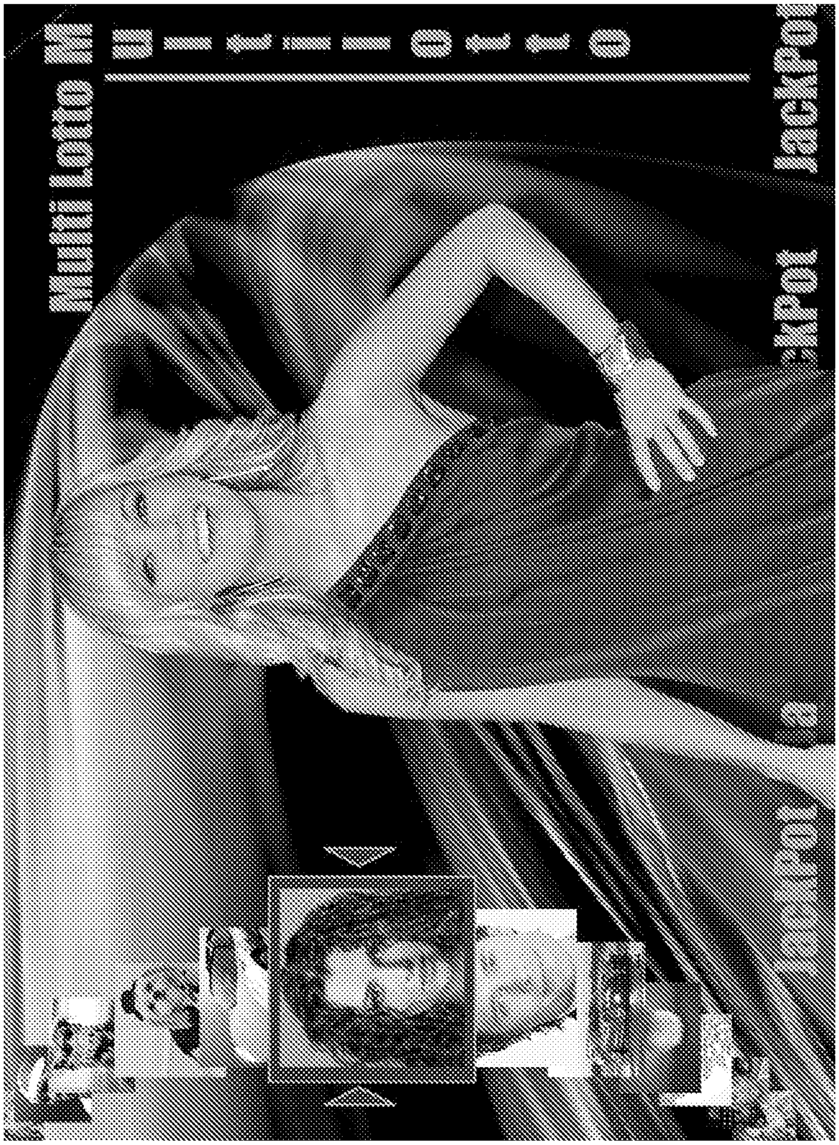
FIG. 3 illustrates an example screenshot of a television program or web production of a broadcast or publicized lottery according to one embodiment of the subject invention. Seven additional figures are provided which illustrate example operations or methods or configurations of certain non-limiting embodiments of the invention, as well as certain example components and functions thereof.
Figure 4A:
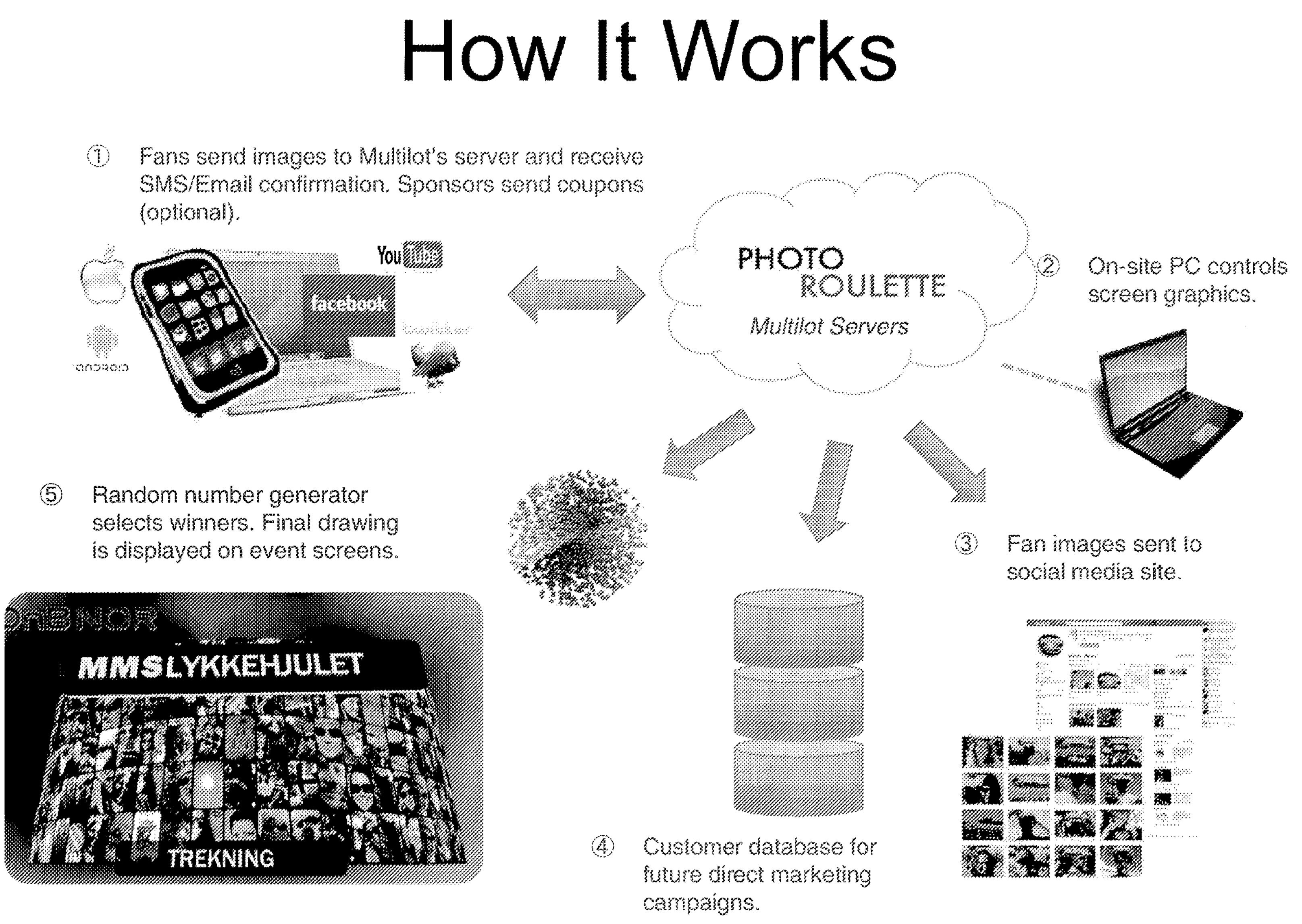
FIG. 4*a* illustrates example operations or methods or configurations of certain non-limiting embodiments of the invention, as well as certain example components and functions thereof.
Figure 4B:
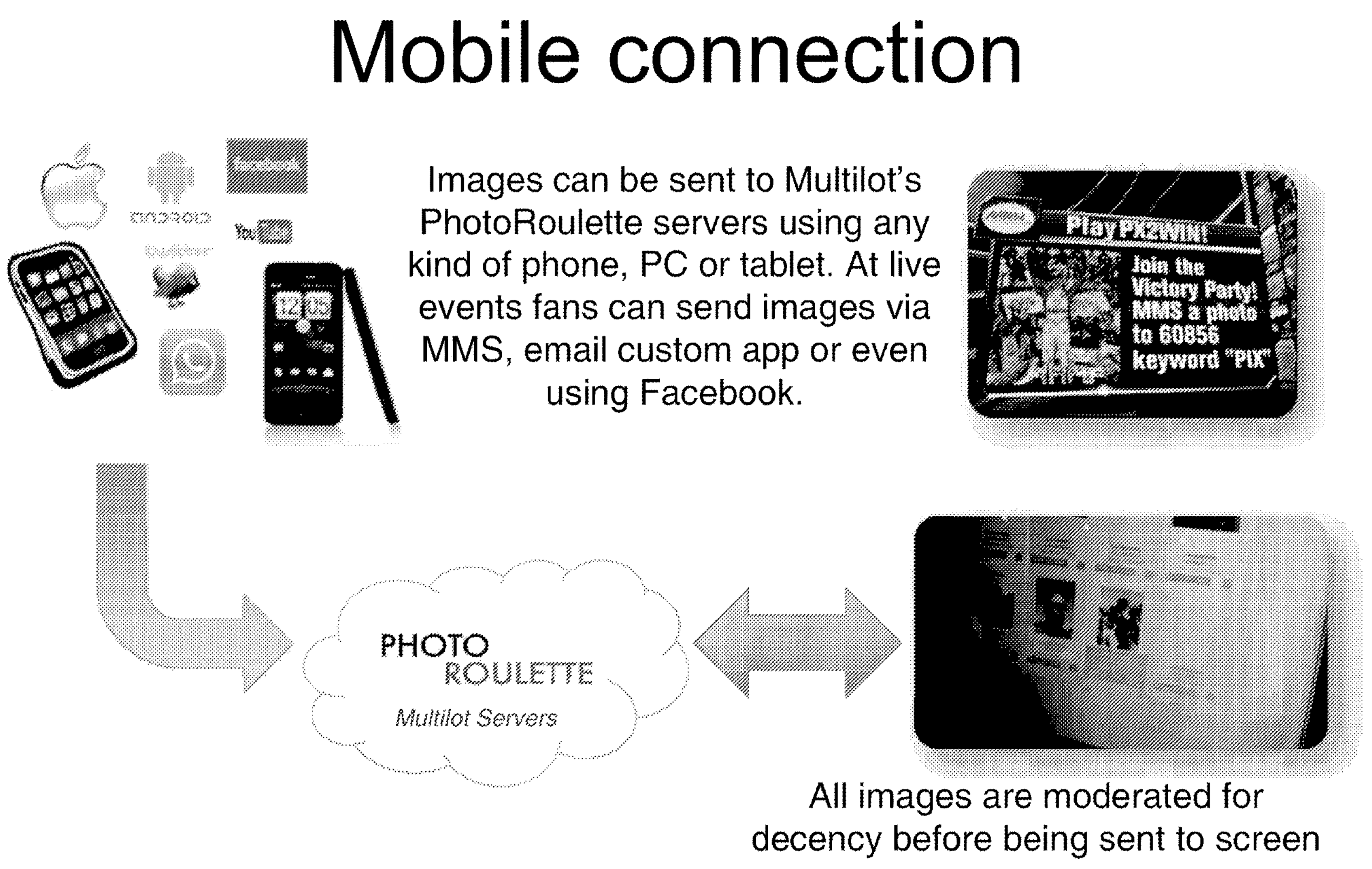
FIG. 4*b* illustrates example operations or methods or configurations of certain non-limiting embodiments of the invention, as well as certain example components and functions thereof.
Figure 4C:
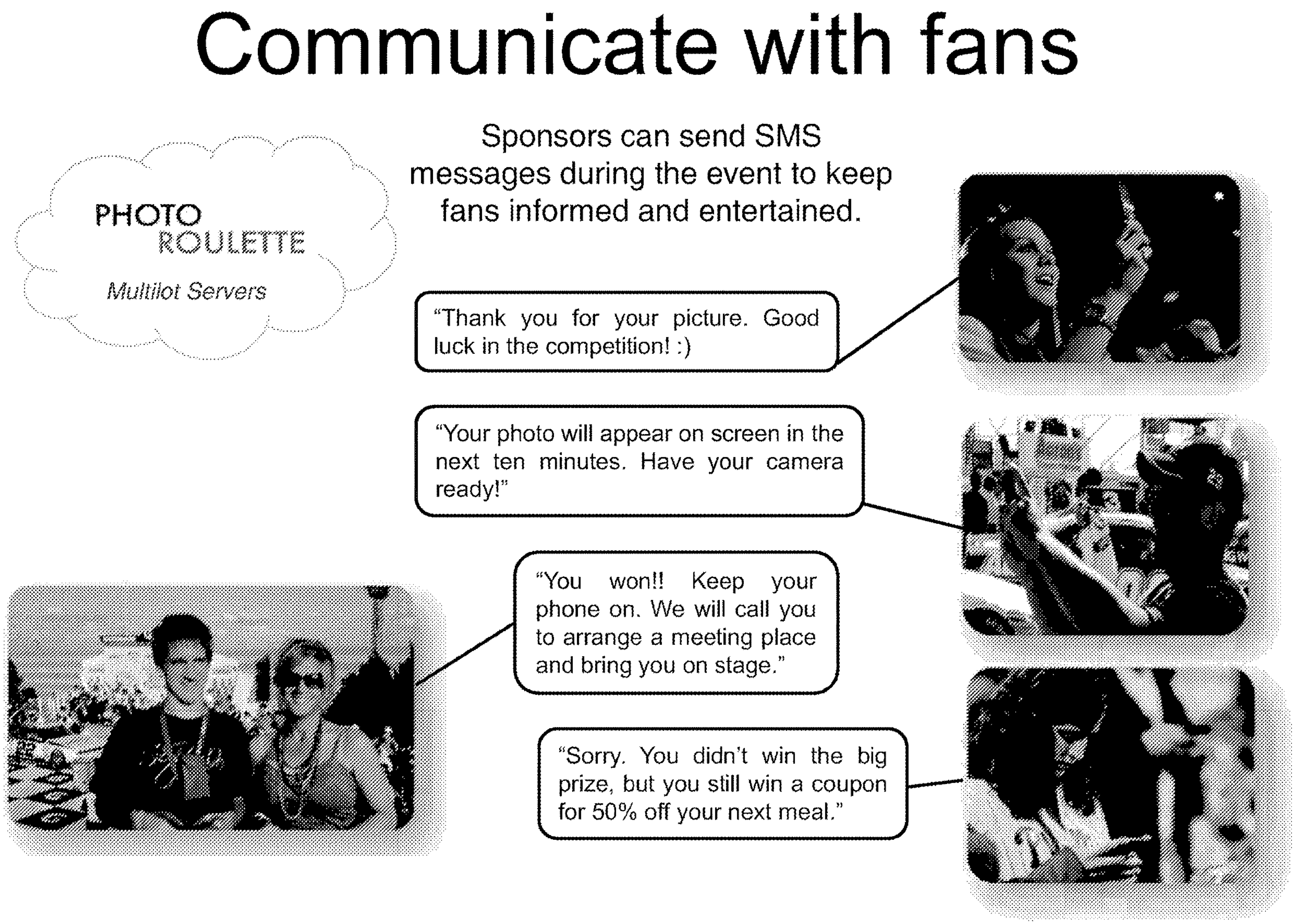
FIG. 4*c* illustrates example operations or methods or configurations of certain non-limiting embodiments of the invention, as well as certain example components and functions thereof.
Figure 4D:
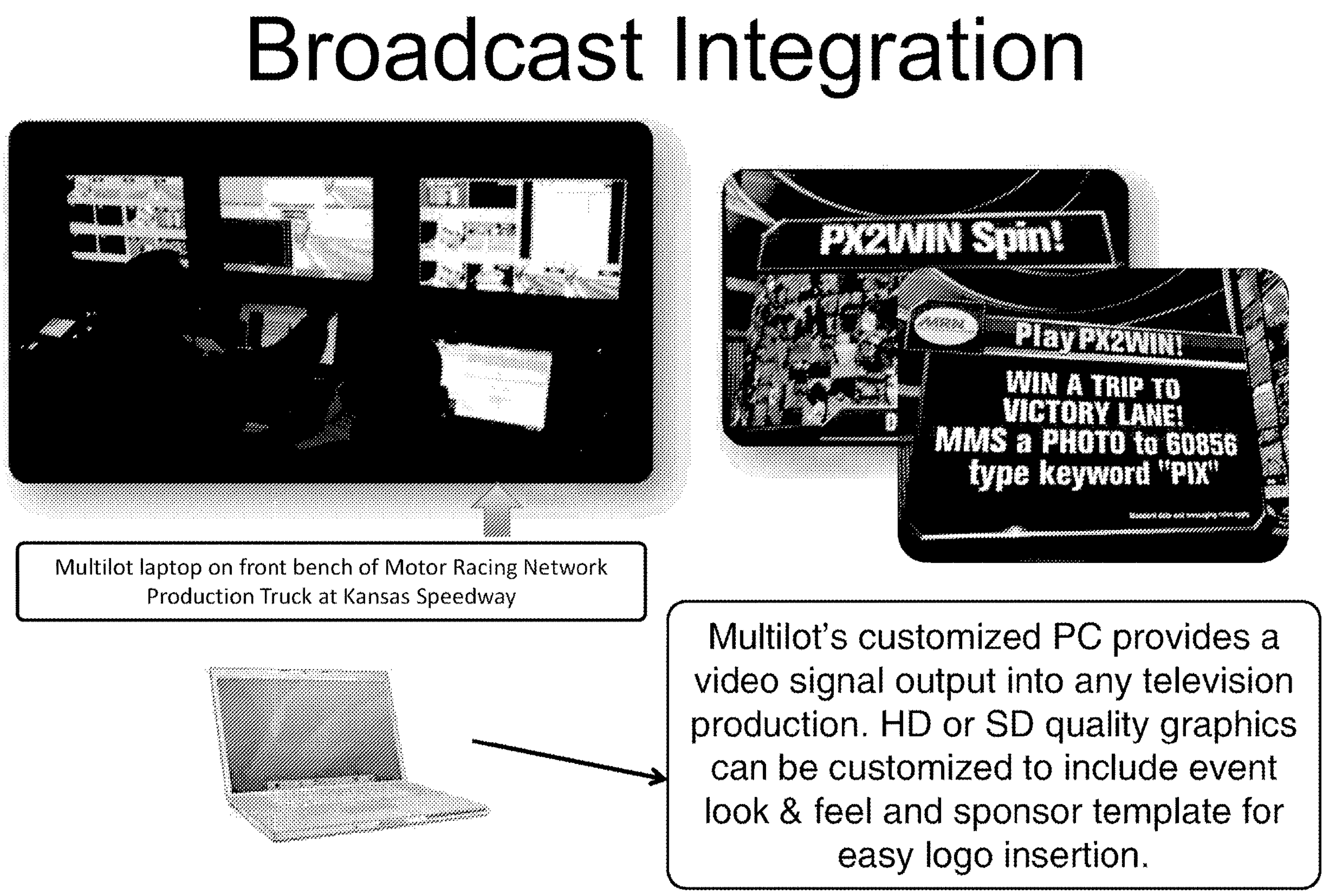
FIG. 4*d* illustrates example operations or methods or configurations of certain non-limiting embodiments of the invention, as well as certain example components and functions thereof.
Figure 4E:
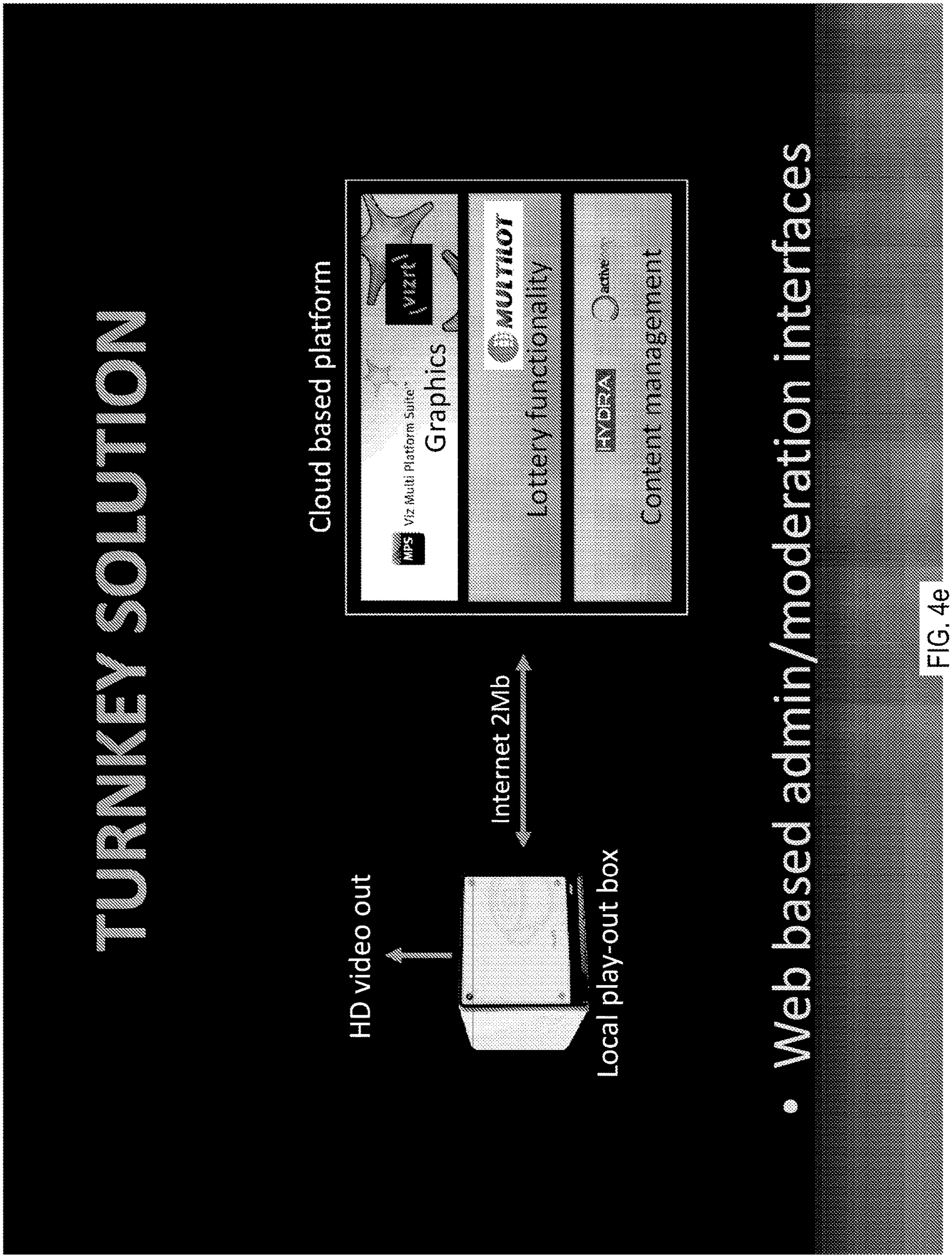
FIG. 4*e* illustrates example operations or methods or configurations of certain non-limiting embodiments of the invention, as well as certain example components and functions thereof.
Figure 4F:
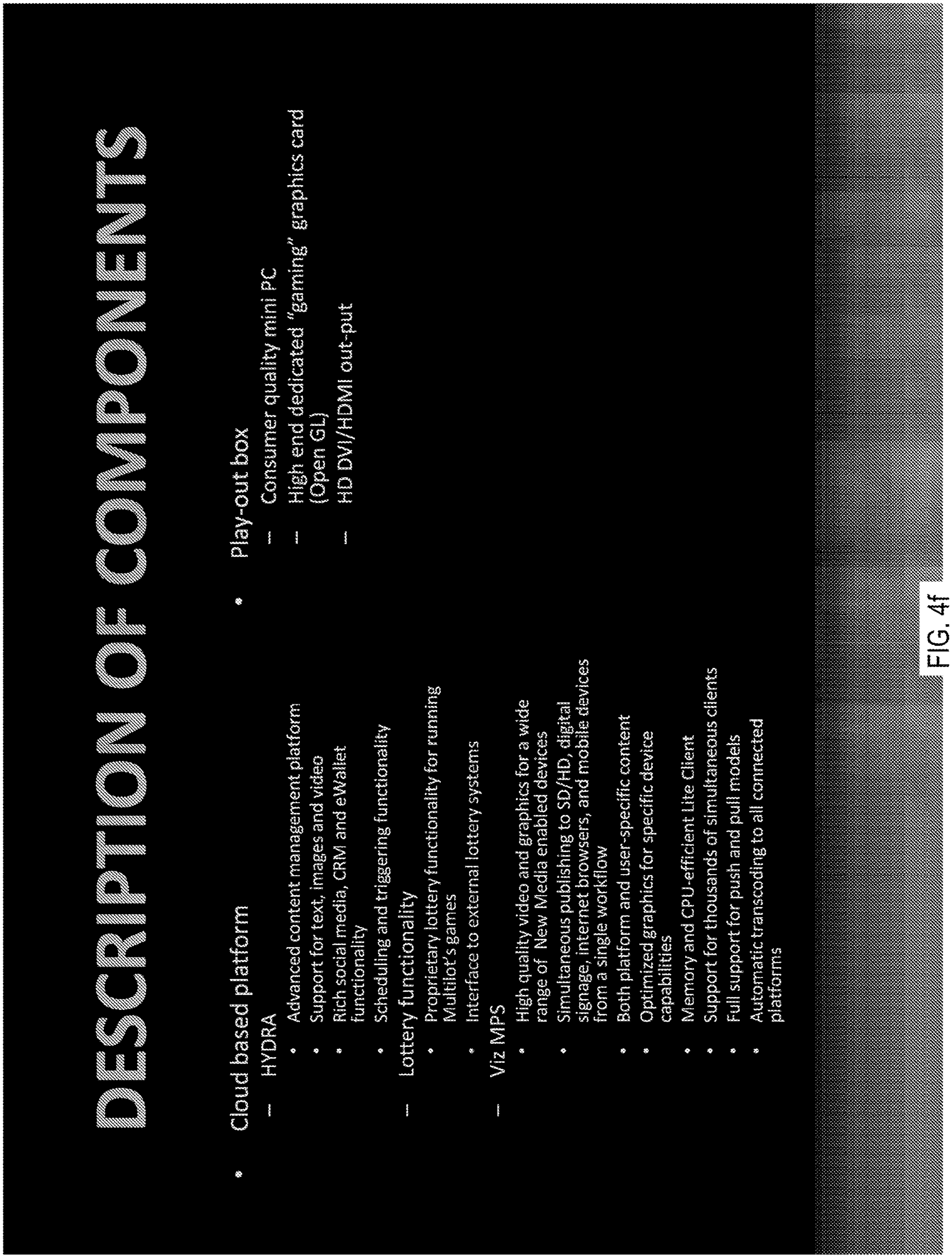
FIG. 4*f* illustrates example operations or methods or configurations of certain non-limiting embodiments of the invention, as well as certain example components and functions thereof.
Figure 4G:
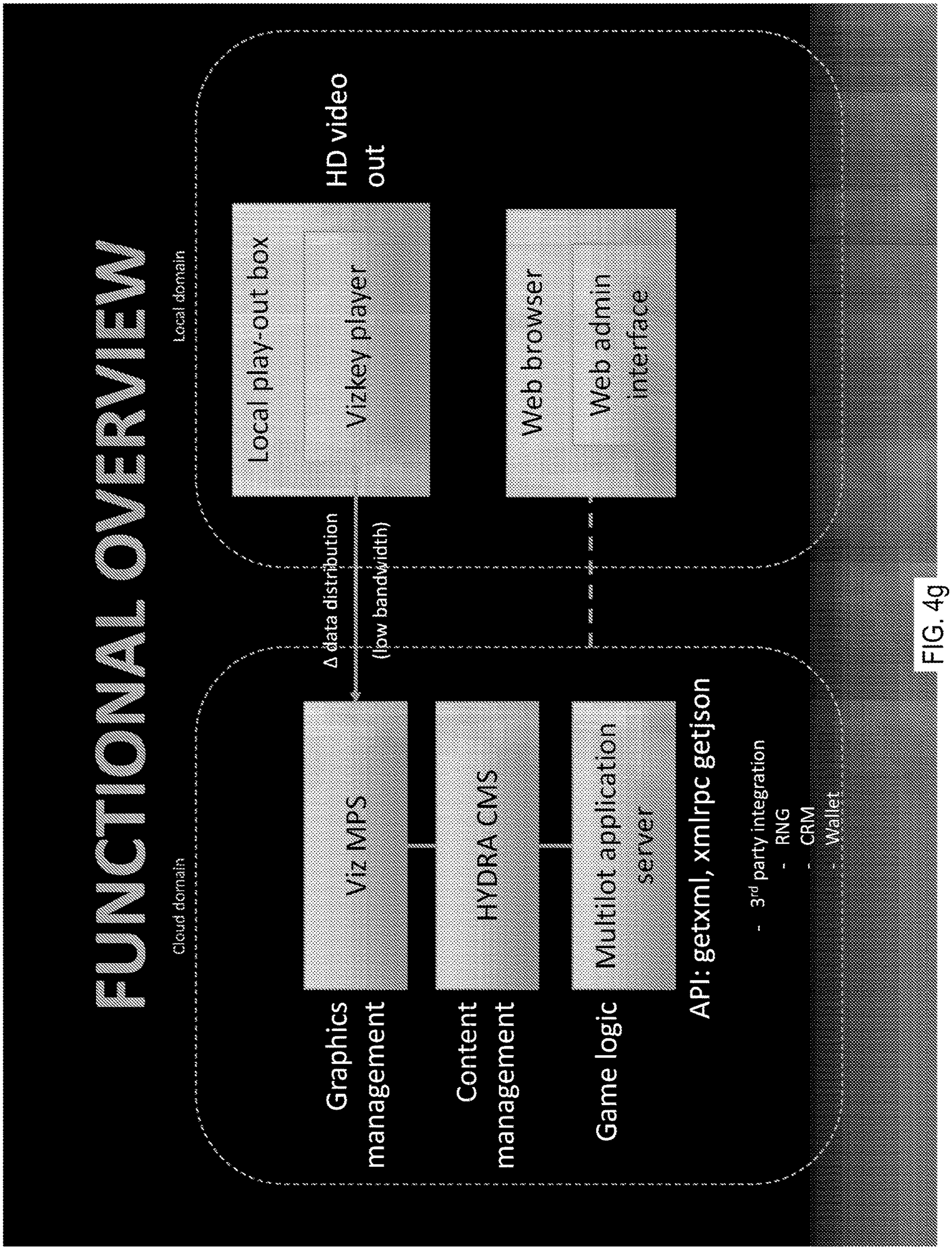
FIG. 4*g* illustrates example operations or methods or configurations of certain non-limiting embodiments of the invention, as well as certain example components and functions thereof.

As contemplated by the Applicant herein, at least one purpose of the television broadcast or other type broadcast or publication of the subject lotteries is to provide a visual, more engaging component to the herein described lottery systems and methods. In this regard, by broadcasting or publicizing images or photographs submitted by lottery contestants (see FIG. 3, for example), participation in such lotteries and/or viewership of such lotteries is expected to improve (e.g., because of the prospect of viewing a neighbor's or friend's or one's own submitted image or photograph) thereby bringing additional revenue to such lotteries. Although such goal is believed to be best accomplished by broadcasting or publicizing (visually) multiple levels or stages of the herein described lotteries, it is, of course, contemplated that no stages or only one stage of such lotteries are publicized or broadcast (with the photograph or image information otherwise providing additional verification of the identity of the lottery contestant, among other benefits, for example).

In addition to the other benefits and advantages of the lottery tickets, methods, and systems described herein, it is noted that by utilizing an electronic contestant entry procedure and/or process and/or ticket, in certain embodiments, new lotteries can be organized and/or initiated in short periods of time. Moreover, previously organized or initiated lotteries can be completed in condensed time frames. For example, in certain embodiments, new lotteries can be announced to prospective contestants via television commercials, web broadcasts, SMS texts, or MMS messages, and the lotteries can be completed quickly or within some compressed time frame thereafter. For example, prospective participants generally interested in lotteries could subscribe to notification services which will send SMS or MMS messages (or emails) to such subscribers announcing the creation or initiation of new lotteries. Utilizing the technologies including tickets, methods, and systems described herein, such announced or initiated lotteries could be joined or entered virtually instantaneously (e.g., without requiring a trip to a remote lottery ticket purchase center) such as by return MMS message or email message (e.g., with included image and/or payment information as described herein above).

In at least one example embodiment, games can be provided which can be played contemporaneously with the attendance of a live event, such as a sporting event or musical performance (or trade show). In at least one such example embodiment, potential game participants attending a live event, such as a baseball game, are displayed an advertisement on stadium screens and through such advertisements in the stadium, are invited to enter into a competition or game to win a prize. In this non-limiting example, entrants are not charged a game entry fee for participating in the game or contest. Instead, hopeful participants can simply send a photograph to an identified "short code" (or to a phone number or email address, for example) by the invited method, i.e., via conventional MMS message, for example. Although standard earner MMS messaging or data may be charged, no other costs would be charged to the participants. At some later time during the event, the stadium screens will display the selection process of the prize winner or winners. For example, the photographs of the entrants may be displayed in a photo carousel or on a spinning photo-wheel, displaying numerous entrant photographs, that spins around and stops at the winning photograph. Photographs of entrants may be displayed (concurrently or via alternating displays)—such as cascaded—in any other aesthetically desirable way, of course. A financial sponsor or sponsors of the games can structure the game so that participants are sent a link to a social networking page (e.g., to a Facebook page) or to an internet web-page where they can see their photographs combined with logos representative or associated with the events they attended and/or the sponsors of the game.

In the live events described, games may be delivered or otherwise provided via cloud-based software. Cloud servers, in such example embodiments, may be operated and owned by the game provider, or the game provider may use the existing cloud server services of existing third party providers (such as cloud storage provided by companies such as IBM, Amazon, Google, Microsoft, and the like). Alternatively, the game provider may install physical servers at or near the event locations, or even in mobile vehicles, such as temperature controlled cargo vehicles carrying their own power supplies and game servers. Regardless of where the software is hosted (e.g., locally or in the cloud), the games may be streamable or downloadable by the lottery participant or by the event sponsor.

In certain of such embodiments (but not all of such embodiments), a game sponsor's name and/or logo will be featured or otherwise displayed on the stadium screens and/or also in the confirmation messages participants receive on their mobile phones or similar communications devices. Coupons (or other redeemable certificate types), advertisements, and/or other marketing information or participation rewards may also be sent. Similarly, surveys (or other sponsor related inquiries) could be sent, for example, with rewards or other compensation possibly provided to the participants which actually complete the surveys.

First Example (Non-Limiting) Steps in One Method or System of Administering an Embodiment of the Herein Described Games or Lotteries I. Registering the Customer 1. In certain embodiments, for a customer to enter the lottery, the customer may provide or register one or more of the following details:
   - Name
   - Phone number
   - E-mail
   - Address
   - Birth date or age Of course, in some embodiments, only some of the example identifying detail listed above may be provided. For example, a phone number and name may be the only information given and may be collected by way of receipt of an SMS or other message from the lottery participant.

2. Terms of use may be presented or displayed and may be required to be accepted by the customer prior to issuance or acceptance of lottery ticket.
3. Information registered in the database may be encrypted.

II. Taking the Picture

1. The customer takes a digital picture utilizing a camera-phone or ordinary digital camera.

-or-

2. The customer scans an ordinary photo or image and uploads the photo or image to his/her phone or computer.

-or-

3. The customer uses an existing digital image created by the customer or any third party or other source.
4. The customer utilizes a publicly available lottery kiosk to create a digital image.

III. Sending the Digital Image or Picture

1. The digital image is sent to the lottery server by using a mobile phone, tablet, or similar device's MMS utility (or installed software "app" or application).

-or-

2. The digital image is sent to the lottery server by e-mail or instant message ("IM") or via an internet chat service or via satellite connection (for instance from a mobile phone or electronic tablet) or by similar electronic mechanism or means (e.g., from a social networking site or web site interface).

-or-

3. The digital image is sent to the lottery server using a lottery kiosk.

IV. Paying

1. The customer pays in advance by way of an existing, conventional payment and debit solution for mobile phones.

-or-

2. The customer has the cost of the lottery ticket and the cost of the data transfer added to the customer's phone bill.

-or-

3. The customer has the cost of the lottery ticket (e.g., and possibly the cost of the data transfer) deducted from his or her pre-paid mobile phone card (e.g., instantly).

-or-

4. The customer pays via the internet by way of bank transfer.

-or-

5. The customer pays via the internet by way of debit card or credit card.

-or-

6. The customer pre-pays the lottery ticket in a kiosk.

V Receiving payment

1. When payment is received by way of an existing payment and debit solution for mobile phones, the payment and its amount may be encrypted (but is not required to be) and then registered and linked to the customer's profile in the database.

-or-

2. When payment is received or confirmed by the customer's mobile phone earner by way of deduction from the customers pre-paid mobile phone card, the payment and its amount may be encrypted and/or registered and linked to the customer's profile in the database.

-or-

3. When payment via internet is confirmed by a credible or trusted third party (i.e., a bank, credit card merchant, PAYPAL, etc.), the payment (optionally) may be encrypted and/or then registered and linked to the customer's profile in the data base.

-or-

4. When payment is received or confirmed by the customer's mobile phone earner by adding the cost to the customer's phone bill, the payment and its amount may (optionally) be encrypted and/or then registered and linked to the customer's profile in the database.

VI. Receiving the Image

1. Upon receipt of an image at the lottery server (or at a later time prior to broadcast or publication, for example), the image may be manually checked in order to make sure it complies with laws and/or general ethical standards.
2. If an image is, for some reason, not in compliance with current laws or ethical standards (e.g., because it is obscene, insulting in nature, etc.), the image may be replaced with a standard, computer generated image.

VII. Sending Receipt

1. The customer may be sent a receipt by SMS text to the number registered in the database, and/or the number the image was sent from, as a confirmation of the transaction.

-or-

2. The customer may be sent an MMS message as a receipt and confirmation of the transaction.

-and/or-

3. If the image submitted for processing as a lottery entry was deemed unfit for any reason (e.g., unlawful for public broadcast), the customer may be notified by way of SMS or MMS or other mechanism.

VIII. Registering the Picture, Creating the Lottery Ticket

1. Upon receipt of an image at the lottery server (or, in other embodiments, prior to submitting the image to the lottery administrator), the image may be encrypted.
2. The encrypted image is linked to the payment, the amount and origin of the payment (and possibly other contestant information, if desired) and may be assigned and linked to a unique sequence number. The encrypted image serves as the actual lottery ticket.
3. The lottery ticket created in step 2 above is linked to the customer's profile.
4. The received image is combined with contestant information, payment details, and a unique sequence number and is encrypted to form an information capsule which serves as an actual lottery ticket.

-or-

5. The received image is combined with contestant information, payment details, and a unique sequence number which serves as an actual lottery ticket (i.e., without performing an encryption step or forming an information capsule).

IX. The Draw

1. A random number generator generates a unique random number for every participant's customer profile. Alternatively, a unique number is assigned to each lottery ticket at an earlier time or during an earlier step such as when the image and payment are registered as a lottery ticket.
2. In an intermediate or lottery advancement (or final winner) stage, depending on the number of participants, the random number generator generates one or more numbers.
3. The numbers generated or "drawn" in step 2 are matched to lottery tickets generated or validated in earlier steps by matching such drawn numbers to the numbers assigned or affiliated with such lottery tickets in previous steps. The customers (or customer profiles) associated with such matches are deemed winners (e.g., final or advancement stage winners).

-or-

4. Steps 2 and 3 can be repeated until the lottery provider (or operator) has a fitting or desired number of participants or images for the final winner draw (e.g., for display on the internet or for broadcast on television or on a stadium screen).
5. Optionally, images can be screened by moderators at this stage in addition to or instead of at earlier stages when or if there are large numbers of lottery participants.

X. The Show

1. The television show or webcast or website will display images that represent entrants to the lottery.
2. One or more winners will be drawn by a random number generator.
3. The final winner (or intermediate stage winners) will be shown on a television show or webcast or website (or other desired public medium).
4. If the lottery ticket image was an MMS sent by mobile phone, the participant may be called on the phone number it was sent from, if no preferred alternate number was provided (or may be contacted by other mechanism or means).
5. The show (or webcast or internet display) may be broadcast or published as pre-recorded, with delay, or live.

XI. The Confirmation of Winnings

1. As an optional service, informal confirmation of winnings may be given by SMS, e-mail or MMS.
2. Binding confirmation of winnings is given in writing.

XII. Other Functions and Applications

1. In order to prevent money laundering or unhealthy and compulsive gambling habits from emerging, a database can be utilized to automatically track the gaming patterns of separate individuals. The database may be optionally created by collecting data from payment information submitted for each entrant. For example, if payment is received with a credit card or checking account, the use of the same account numbers can be monitored, tracked, and/or tallied. These numbers can be compared against a database of known or suspected abusers or money launderers. In other or similar embodiments, the names of entrants, or the identification of entrants, may be collected.

-and/or-

2. If money laundering is detected, or if an unhealthy gambling pattern emerges, measures can be taken to prevent negative effects, such as by providing SMS, MMS or email warnings and advice to lottery entrants as well as by instituting restrictions for individual lottery participants. Moreover, restrictions and changes can be made to the lottery game itself. The lottery provider or operator may also, optionally, exclude individuals entirely, or report them to law enforcement officials.

-and/or-

3. A database or other utility may be utilized, created in association with the operation of the lottery, so that the lottery game automatically enforces age limits or other terms or conditions of the specific lottery game itself (which may be changed from game to game or country to country or state to state, for example).

Second Example (Non-Limiting) Steps in One Method or System of Administering an Embodiment of the Herein Described Games or Lotteries I. Registering the Customer
1. In certain embodiments, for a customer to enter the lottery, the customer may provide or register one or more of the following details:
   Name
   Phone number
   E-mail
   Address
   Birth date or age Of course, in some embodiments, only some of the example identifying detail listed above may be provided. For example, a phone number and name may be the only information given and may be collected by way of receipt of an SMS or other message from the lottery participant.

2. Terms of use may be presented or displayed and may be required to be accepted by the customer prior to issuance or acceptance of lottery ticket.
3. Information registered in the database may be encrypted.

II. Taking the Picture
1. The customer takes a digital picture utilizing a cameraphone or ordinary digital camera.

-or-

2. The customer scans an ordinary photo or image and uploads the photo or image to his/her phone or computer.

-or-

3. The customer uses an existing digital image created by the customer or any third party or other source.

-or-

4. The customer utilizes a publicly available lottery kiosk to create a digital image.

III. Sending the Digital Image or Picture
1. The digital image is sent to the lottery server by using a mobile phone, tablet, or similar device's MMS utility (or installed software "app" or application).

-or-

2. The digital image is sent to the lottery server by e-mail or instant message ("IM") or via an internet chat service or via satellite connection (for instance from a mobile phone or electronic tablet) or by similar electronic mechanism or means (e.g., from a social networking site or web site interface).

-or-

3. The digital image is sent to the lottery server using a lottery kiosk.

IV. Receiving the Image
1. Upon receipt of an image at the lottery server (or at a later time prior to broadcast or publication, for example), the image may be manually checked in order to make sure it complies with laws and/or general ethical standards.
2. If an image is, for some reason, not in compliance with current laws or ethical standards (e.g., because it is obscene, insulting in nature, etc.), the image may be replaced with a standard, computer generated image.

V Sending receipt
1. The customer may be sent a receipt by SMS text to the number registered in the database, and/or the number the image was sent from, as a confirmation of the transaction.

-or-

2. The customer may be sent an MMS message as a receipt and confirmation of the transaction.

-and/or-

3. If the image submitted for processing as a lottery entry was deemed unfit for any reason (e.g., unlawful for public broadcast), the customer may be notified by way of SMS or MMS or other mechanism.

VI. Registering the Picture, Creating the Lottery Ticket
1. Upon receipt of an image at the lottery server (or, in other embodiments, prior to submitting the image to the lottery administrator), the image may be encrypted.
2. The encrypted image is linked to contestant information, if desired, and may be assigned and linked to a unique sequence number. The encrypted image serves as the actual lottery ticket.
3. The lottery ticket created in step 2 above is linked to the customer's profile.
4. The received image is combined with contestant information and a unique sequence number and is encrypted to form an information capsule which serves as an actual lottery ticket.

-or-

5. The received image is combined with contestant information and a unique sequence number which serves as an actual lottery ticket (i.e., without performing an encryption step or forming an information capsule).

VII. The Draw
1. A random number generator generates a unique random number for every participant's customer profile. Alternatively, a unique number is assigned to each lottery ticket at an earlier time or during an earlier step such as when the image and payment are registered as a lottery ticket.
2. In an intermediate or lottery advancement (or final winner) stage, depending on the number of participants, the random number generator generates one or more numbers.
3. The numbers generated or "drawn" in step 2 are matched to lottery tickets generated or validated in earlier steps by matching such drawn numbers to the numbers assigned or affiliated with such lottery tickets in previous steps. The customers (or customer profiles) associated with such matches are deemed winners (e.g., final or advancement stage winners).

-or-

4. Steps 2 and 3 can be repeated until the lottery provider (or operator) has a fitting or desired number of participants or images for the final winner draw (e.g., for display on the internet or for broadcast on television or at a spectator event).
5. Optionally, images can be screened by moderators at this stage in addition to or instead of at earlier stages when or if there are large numbers of lottery participants.

VIII. The Show

1. The television show or webcast or website or stadium display (e.g., at a spectator or similar event) will display images that represent entrants to the lottery.
2. One or more winners will be drawn by a random number generator.
3. The final winner (or intermediate stage winners) will be shown on a television show or webcast or website (or other desired public medium, such as a display screen at a spectator event).
4. If the lottery ticket image was an MMS sent by mobile phone, the participant may be called on the phone number it was sent from, if no preferred alternate number was provided (or may be contacted by other mechanism or means).
5. The show (or webcast or internet display or display at a spectator event) may be broadcast or published as pre-recorded, with delay, or live.

IX. The Confirmation of Winnings

1. As an optional service, informal confirmation of winnings may be given by SMS, e-mail or MMS.
2. Binding confirmation of winnings is given in writing.

X. Other Functions and Applications

1. In order to prevent unhealthy and compulsive gambling habits from emerging, a database can be utilized to automatically separate and track the gaming patterns of separate individuals.

-and/or-

2. If an unhealthy gambling pattern emerges, measures can be taken to prevent negative effects, such as by providing SMS, MMS or email warnings and advice to lottery entrants as well as by instituting restrictions for individual lottery participants. Moreover, restrictions and changes can be made to the lottery game itself. The lottery provider or operator may also, optionally, exclude individuals entirely.

-and/or-

3. A database or other utility may be utilized, created in association with the operation of the lottery, so that the lottery game automatically enforces age limits or other terms or conditions of the specific lottery game itself (which may be changed from game to game or country to country or state to state, for example).

Third Example (Non-Limiting) Steps in One Method or System of Administering an Embodiment of the Herein Described Games or Lotteries In at least one embodiment, there is envisioned a lottery or sweepstakes in which a contestant (or entrant) submits a photograph (or image) to the game provider, in which the game provider generates a lottery number from the photograph submitted. That is, as described elsewhere in the specification, after a photograph is submitted to the game provider, the photograph is analyzed for features such as the number of objects or persons depicted, the shape of the objects or persons depicted, the colors depicted, image contrast, color saturation, etc. As part of this analysis, the data collected is processed and used to generate a unique number from the image, which is thereafter affiliated with the game entrant, and then used as a mechanism to select or drawn a game winner. A description of an example game is provided below:

I. Taking the Picture

1. The customer takes a digital picture utilizing a cameraphone or ordinary digital camera.

-or-

2. The customer scans an ordinary photo or image and uploads the photo or image to his/her phone or computer.

-or-

3. The customer uses an existing digital image created by the customer or any third party or other source.

-or-

4. The customer utilizes a publicly available lottery kiosk to create a digital image.

II. Sending the Digital Image or Picture

1. The digital image is sent to the lottery server by using a mobile phone, tablet, or similar device's MMS utility (or installed software "app" or application).

-or-

2. The digital image is sent to the lottery server by e-mail or instant message ("IM") or via an internet chat service or via satellite connection (for instance from a mobile phone or electronic tablet) or by similar electronic mechanism or means (e.g., from a social networking site or web site interface).

-or-

3. The digital image is sent to the lottery server using a lottery kiosk.

III. Receiving the Image

1. Subsequent to receipt of an image at the lottery server, the image is analyzed for color, contrast, object numbers/shapes, etc. (as described herein) and the data obtained is used to generate a unique entrant number affiliated with the image and therefore affiliated with the game entrant.

IV. Sending Receipt (Optional)

1. The customer may be sent a receipt by SMS text to the number registered in the database, and/or the number the image was sent from, as a confirmation of the transaction.

-or-

2. The customer may be sent an MMS message as a receipt and confirmation of the transaction.

-and/or-

3. If the image submitted for processing as a lottery entry was deemed unfit for any reason (e.g., unlawful for public broadcast), the customer may be notified by way of SMS or MMS or other mechanism.

V. the Draw

1. A random number generator generates a unique random number to be used as the winning game number.

-or-

2. A winning number may be selected by other means such as by the game provider selecting or taking a photograph to use to generate a winning number, using the same techniques used to generate the entrant numbers from submitted photographs.

VI. Winner Selection

1. The number selected as the winning game number in the "draw" step (Step V) is matched to a game entrant number determined in Step III. If no exact match is determined, the closest number to a match is optionally selected. Once a suitable game entrant number match to the winning number is identified, the winner of the game is declared. Such winner is the game entrant that submitted the photograph (or other image) which resulted in the game entrant number which matched (or most closely matched) the selected winning number. Optionally, the image used to generate the winning game entrant number is then identified and used to publicize the winner. Optionally, if no exact number matches are determined in this stage, no winner can be declared and any prizes can be carried over to a subsequent game.

Alpha-Numeric Lottery Example

Addressing yet additional needs, desires, or drawbacks in the lottery arts (or other drawbacks or needs not specifically described herein), at least one embodiment of the subject invention comprises a unique lottery ticket comprised of digital numbers and/or letters submitted by a contestant in combination with payment for lottery participation. Such a sequence of numbers and/or letters and/or payment information is compiled and/or encrypted to form a secure information capsule which serves as a lottery ticket. When such a capsule is encrypted, the information contained in the lottery ticket (including the identity of the contestant, the numbers and/or letters, and possibly other information) is secured from unauthorized access and therefore aids in preventing tampering with lottery integrity. Because numerous other types of information may be provided in connection with a digital numbers and/or letters (e.g., at the time of purchase of lottery participation), such as a contestant's name, address, phone number, sex, birth date, date/time of ticket purchase, etc., such categories of information, including payment information, are periodically referred to herein as, and are intended within the scope of this document to be, synonymous with the term "contestant information".

Referring now to FIG. 1, a non-limiting, example embodiment of a lottery system which utilizes such a lottery ticket (e.g., comprised of a digital numbers and/or letters and contestant information compiled or encrypted to form an information capsule) is schematically depicted therein. Generally speaking, such a lottery system 1 includes five main stages or phases which begin with entry of a contestant into the lottery and terminate with the selection of a lottery winner and the broadcast or publication of such lottery winner on a television program, webcast, website, or the like.

More specifically, the lottery begins with phase 1 where the prospective lottery contestant submits digital numbers and/or letters to the lottery provider. Such digital numbers and/or letters may be delivered using a cellular phone (or scanned with a built-in camera) or may be scanned with a conventional camera and then uploaded to a computer or cellular phone for submission. Similarly, a scanner may be used to create a digital numbers and/or letters or an numbers and/or letters may simply be obtained from third party sources or even authored via third party software applications. In still another example, lottery kiosks may be provided in public locations, such as grocery or convenience stores, with such kiosks including scanners and appropriate data or internet connections for submitting numbers and/or letters. Regardless of how the numbers and/or letters are created (and regardless of the type of numbers and/or letters file which is employed), the numbers and/or letters is ultimately submitted to the lottery provider or administrator using suitable methods or mechanisms. These may include, but are not limited to, via MMS message, internet (e.g., via email), proprietary software interface (e.g., contained or downloaded onto a computer, hand held device, or mobile phone), or via the above-described kiosk, for example. In at least one embodiment (not intended to be limiting to the invention), once a numbers and/or letters is submitted to the lottery provider, the numbers and/or letters is stored on one or more lottery servers in association with a unique user profile linked or associated with the lottery contestant (e.g., created simultaneous with, prior to, or after the submission of a suitable numbers and/or letters).

In phase 2, subsequent or simultaneous with phase 1 (or even prior thereto), a lottery contestant submits payment for lottery participation (e.g., payment for entry into the lottery, issuance of the ticket, and the chance at winning prizes or money). Such payment can be completed using functionalities or services offered by contestants' mobile operators where the owners of the mobile phones (or cellular phones) are charged or billed through their mobile subscription either as a credit, debit, or via deduction from a pre-paid account (e.g., a pre-paid SIM card). This billing or debiting (or at least the recording of the transaction) may occur simultaneous with a numbers and/or letters submission to the lottery operator, for example. In other example embodiments, user profiles may be linked to payment services or options such as merchant accounts, credit or debit cards, or PAYPAL type accounts (e.g., such that when an numbers and/or letters is submitted to the lottery administrator, payment is automatically completed via payment services linked to the user profile). However payment is made, in exemplary embodiments of the invention, whenever a numbers and/or letters is submitted to the lottery provider (or when the lottery provider processes or accepts a submitted numbers and/or letters), a valid payment is registered and a lottery ticket purchase (or lottery entry) is fulfilled. Thereafter, in phase 3, the process of creating a numbers and/or letters type lottery ticket is begun.

In particular, during phase 3, the numbers and/or letters file submitted by the lottery contestant is converted into a lottery ticket, as schematically illustrated in FIG. 2, which, optionally, can be used in an existing or conventional lottery process and infrastructure. This conversion, in preferred (but not necessarily all) embodiments, includes a combination or compilation of the digital numbers and/or letters with contestant information, which preferably includes payment information, as defined herein above. Generally speaking, each lottery ticket (e.g., created from a digital numbers and/or letters, etc.) converted or created results in one or two linked self-contained information capsules (e.g., created or stored as a ".lot" file with associated MIME type(s) to process the file), which, in preferred embodiments, carries all (or at least some) information necessary to secure lottery ticket integrity and to re-generate the originally submitted lottery picture or numbers and/or letters (and/or contestant information). Further, in at least some embodiments, each information capsule and lottery ticket (we need one capsule for contestant's information and one for "numbers and/or letters) created will be linked to the users (i.e., numbers and/or letters issuer's or lottery contestant's) unique player profile.

In certain embodiments, when the numbers and/or letters are received from an issuer (i.e., a lottery contestant), the lottery provider or administrator charges a fee to convert the numbers and/or letters into a lottery ticket. In preferred embodiments, traceable banking information—for example routing numbers or information and/or clearing house numbers—will be integrated in whole or in part into the lottery ticket.

Also (in at least some embodiments) during phase 3, to ensure, among other things, that each lottery ticket has a unique value or identifier, a serial number will be generated and integrated into or associated with the lottery ticket. Such a serial number may be generated randomly or as a result of data provided by the lottery contestant (e.g., derived from digital numbers and/or letters information and/or contestant information). There is also a unique serial number generated for every single contestant.

In certain embodiments of the invention (but not necessarily all embodiments), open source extendable numbers and/or letters formats are used for compressing or packing information, but in some cases, non-open source (for example, proprietary) formats will be used. In embodiments in which non-open source or proprietary formats are used, such use may be employed for the purpose of further uniquely identifying numbers and/or letters or generated lottery tickets. Such use, in this regard, may provide security or integrity to the lottery system or method by indicating the presence of or by providing necessary lottery information. Although conventional PKI type encryption may be used to encrypt information capsules and/or tickets and/or contestant information (e.g., so that the tickets or information capsules, etc. can only be opened or accessed by authorized persons to thereby provide additional integrity or security to the lottery system), it is contemplated, of course, that other encryption types or methods may be used (or that other data securitization types or methods, exclusive of encryption, may be used) regardless of whether in existence at the time of the present application for patent.

Of course, each of these steps or processes just described related to encryption, compilation of data, and/or otherwise related to the creation of the information capsule or lottery ticket (whether or not encrypted at this stage or later or not at all) may be performed by the lottery contestant rather than the entity administering the lottery (or such entity's equipment or agent), or by some combination thereof. For example, software may be provided either preloaded into computers or mobile devices or made available as downloads (e.g., as an iPhone software application). Such software could be used by a lottery contestant to pre-encrypt numbers and/or letters and contestant information or to otherwise create a valid, secure lottery ticket (e.g., or information capsule) prior to or simultaneous with submission of such to the entity administering the lottery (whether or not such lottery ticket or information capsule is encrypted, by compiling or combining appropriate data or information).

In phase 4 or the lottery draw phase, a lottery drawing will take place in which lottery entrants will either be selected to advance to intermediate or advancement phases of the lottery and/or a final lottery winner or winners will be selected. In certain example (but non-limiting) embodiments, a lottery draw is conducted utilizing an approved (and preferably secure) random number generator and/or lottery draw machine supplied by one of a number of possible vendors.

In certain but not all embodiments, the draw is completed in several rounds such as "qualification", "advancement", and "final" rounds. In an example of one of such embodiments, a first round is completed or performed to select a plurality of lottery tickets which, as winners of an initial lottery stage (or "qualification draw"), enter or proceed to the next levels or stages of the lottery. In such later stages, further draws are completed which select or determine winners to proceed to additional or a final stage(s). As described in more detail below, one or more (or all) of such draws or levels (e.g., including pictures or numbers and/or letters of the contestants advancing) can be broadcast (or integrated into an existing broadcast) on a television program or otherwise publicized such as on a webcast or website. Further, the various levels of draw may be completed or initiated prior to a television broadcast (for example) or, alternatively, as a live component of a television program (e.g., using pre-moderated numbers and/or letters or photographs from or comprising the lottery tickets).

In some embodiments of the inventive lottery methods and/or systems where moderation of numbers and/or letters is employed (e.g., because of local laws regulations or ethical standards), the approval or moderation process is conducted by software. More particularly, such moderators will review and adjudge the submitted, or winning numbers and/or letters to ensure compliance to regulatory and decency issues (i.e., which will typically be different from market to market and from application to application). If a combination of numbers and/or letters is not compliant or is otherwise not acceptable (e.g., as decided by moderators or other mechanism), it can be censored for use in the associated television program or other form of lottery publication or broadcast.

As contemplated by the Applicant herein, at least one purpose of the television broadcast or other type broadcast or publication of the subject lotteries is to provide a more engaging component to the herein described lottery systems and methods. In this regard, by broadcasting or publicizing numbers and/or letters submitted by lottery contestants (see FIG. 3, for example), participation in such lotteries and/or viewership of such lotteries is expected to improve (e.g., because of the prospect of viewing a neighbor's or friend's or one's own, personal submitted numbers and/or letters) thereby bringing additional revenue to such lotteries. Although such goal is believed to be best accomplished by broadcasting or publicizing (visually) multiple levels or stages of the herein described lotteries, it is, of course, contemplated that no stages or only one stage of such lotteries are publicized or broadcast (with the numbers and/or letters information otherwise providing additional verification of the identity of the lottery contestant, among other benefits, for example).

In addition to the other benefits and advantages of the lottery tickets, methods, and systems described herein, it is noted that by utilizing an electronic contestant entry procedure and/or process and/or ticket, in certain embodiments, new lotteries can be organized and/or initiated in short periods of time. Moreover, previously organized or initiated lotteries can be completed in condensed time frames. For example, in certain embodiments, new lotteries can be announced to prospective contestants via television commercials, web broadcasts, SMS texts, or MMS messages, and the lotteries can be completed quickly or within some compressed time frame thereafter. For example, prospective participants generally interested in lotteries could subscribe to notification services which will send SMS or MMS messages (or emails) to such subscribers announcing the creation or initiation of new lotteries. Utilizing the technologies including tickets, methods, and systems described herein, such announced or initiated lotteries could be joined or entered virtually instantaneously (e.g., without requiring a trip to a remote lottery ticket purchase center) such as by return MMS message or email message (e.g., with included numbers and/or letters and/or payment information as described herein above).

Interstate Player Registration (e.g., in the United States)

The following is a description of a system or method for preventing the following, negative consequences of gambling, such as: gambling addiction; lack of age control; the player losing his/her ticket; theft of tickets; pollution (paper tickets). In one or more of such embodiments, the player must, before participating in a game of chance, supply two or more of the following: full name; address; phone number; debit card number; credit card number; email address; social security number; date of birth; and/or bank account number. The information is optionally, but preferably, provided by the participant via a mobile phone application or via a website. After the information is sent to the database, it is cross referenced with other sources of information (e.g., driver license information, IP address, encryption token) to ensure that the identity of the participant is correct and that the participant is of legal gambling age. Each participant can preferably only have one player profile. The participant can then, via the participant's credit or debit card, participate in games of chance.

If the participant wins, the winnings will be transferred directly to the participant's bank account and or credit or debit card. The participant is issued a receipt and the database retains a copy of the receipt or transfers it to a second database. If the participant spends more money than he or she should, the participant will be locked out of the game for a period of time. This will be defined by either the participant's own spending limits or built-in spending limits. The participant can choose to delete or deactivate his/her profile.

In some of the above or other embodiments, there is also provided a unique lottery, in which electronic payment is accepted (e.g., credit card payment). In such a lottery, lottery play is monitored so that frequent players can be identified. If players play too often, they can be warned and/or play suspended for selected times. Frequency of play acceptability can be the same criteria for all players, or based on salary and/or credit history.

Example (Non-Limiting) Steps in One Method or System of Administering an Embodiment of the Herein Described Lotteries I. Registering the Customer
1. In certain embodiments, for a customer to enter the lottery, the customer must provide or register one or more of the following details:
Name
Phone number
E-mail
Address
Birth date or age
Bank account
Social security number
2. Terms of use are presented or displayed and may be required to be accepted by the customer prior to issuance or acceptance of lottery ticket.
3. Information registered in the database may be encrypted.

II. Creating the Ticket
1. The customer creates a sequence of numbers and/or letters using a mobile phone, tablet or PC. These numbers and/or letters are the customers potential winning numbers and/or letters.

-or-

2. The customer scans a note with printed numbers and/or letters and uploads the numbers and/or letters to his/her phone or computer.

-or-

3. The customer uses existing digital numbers and/or letters created by the customer or any third party or other source.

-or-

4. The customer utilizes a publicly available lottery kiosk to create digital numbers and/or letters.

III. Sending the Numbers and/or Letters
1. The digital numbers and/or letters is sent to the lottery server by using a mobile phone application utility or web interface.

-or-

2. The digital numbers and/or letters is sent to the lottery server by e-mail.

-or-

3. The digital numbers and/or letters is sent to the lottery server using a lottery kiosk.

IV. Paying
1. The customer pays in advance by way of an existing, conventional payment and debit solution for mobile phones.

-or-

2. The customer has the cost of the lottery ticket (e.g., and possibly the cost of the data transfer) deducted from his or her pre-paid mobile phone card (e.g., instantly).

-or-

3. The customer pays via the internet by way of bank transfer.

-or-

4. The customer pays via the internet by way of debit card or credit card.

V. Receiving Payment

1. When payment is received by way of an existing payment and debit solution for mobile phones, the payment and its amount is encrypted, registered and linked to the customer's profile in the database.

-or-

2. When payment is received or confirmed by the customer's mobile phone carrier by way of deduction from the customers pre-paid mobile phone card, the payment and its amount is registered and linked to the customer's profile in the database.

-or-

3. When payment via internet is confirmed by a credible or trusted third party (i.e., a bank, credit card merchant, PAYPAL, etc.), the payment is registered and linked to the customer's profile in the data base.

VI. Receiving the Numbers and/or Letters

1. Upon receipt of an numbers and/or letters at the lottery server (or at a later time prior to broadcast or publication, for example), the numbers and/or letters may be manually checked in order to make sure it complies with laws and/or general ethical standards.
2. If an numbers and/or letters is, for some reason, not in compliance with current laws or ethical standards (e.g., because it is obscene, insulting in nature, etc.), the numbers and/or letters may be replaced with a standard, computer generated numbers and/or letters.

VII. Sending Receipt

1. The customer will be sent a receipt by SMS text to the number registered in the database, and/or the number the numbers and/or letters was sent from, as a confirmation of the transaction.

-or-

2. The customer will be sent an MMS message as a receipt and confirmation of the transaction.

-and/or-

3. If the numbers and/or letters submitted for processing as a lottery entry was deemed unfit for any reason (e.g., unlawful for public broadcast), the customer will be notified by way of SMS or MMS or other mechanism.
4. and/or the customer is notified via the customers player profile online
5. and/or the customer is notified via a designated mobile phone and/or tablet app VIII. Registering and Creating the Lottery Ticket 1. Upon receipt of the numbers and/or letters at the lottery server (or, in other embodiments, prior to submitting the numbers and/or letters to the lottery administrator), the numbers and/or letters may be encrypted.
2. The encrypted numbers and/or letters is linked to the payment, the amount and origin of the payment (and possibly other contestant information, if desired) and may be assigned and linked to a unique sequence number. The encrypted numbers and/or letters serves as the actual lottery ticket.
3. The lottery ticket created in step 2 above is linked to the customer's profile.

-or-

4. The received numbers and/or letters is combined with contestant information, payment details, and a unique sequence number and is encrypted to form an information capsule which serves as an actual lottery ticket.

IX. The Draw

1. A random number generator generates a unique random number for every participant's customer profile. Alternatively, a unique number is assigned to each lottery ticket at an earlier time or during an earlier step such as when the numbers and/or letters and payment are registered as a lottery ticket.
2. In an intermediate or lottery advancement (or final winner) stage, depending on the number of participants, the random number generator generates one or more numbers.
3. The numbers generated or "drawn" in step 2 are matched to lottery tickets generated or validated in earlier steps by matching such drawn numbers to the numbers assigned or affiliated with such lottery tickets in previous steps. The customers (or customer profiles) associated with such matches are deemed winners (e.g., final or advancement stage winners).

-or-

4. Steps 2 and 3 can be repeated until the lottery provider (or operator) has a fitting or desired number of participants or numbers and/or letters for the final winner draw (e.g., for display on the internet or for broadcast on television).
5. Optionally, numbers and/or letters can be screened by moderators at this stage in addition to or instead of at earlier stages when or if there are large numbers of lottery participants.

X. The Show

1. The television show or webcast or website will display numbers and/or letters that represent potential winners of the lottery.
2. Winning numbers will be drawn by a random number generator.
3. The winning numbers and/or letters will be shown on a television show or webcast or website (or other desired public medium).
4. If the lottery ticket numbers and/or letters was sent by mobile phone, the participant can be called on the phone number it was sent from, if no preferred alternate number was provided.
5. The show (or webcast or internet display) may be broadcast or published as pre-recorded, with delay, or live.

XI. The Confirmation of Winnings

1. As an optional service, informal confirmation of winnings may be given by SMS, e-mail or MMS.
2. Binding confirmation of winnings is given in writing.

XII. Other Functions and Applications

1. In order to prevent unhealthy and compulsive gambling habits from emerging, a database can be utilized to automatically separate and track the gaming patterns of separate individuals.

-and/or-

2. If an unhealthy gambling pattern emerges, measures can be taken to prevent negative effects, such as by providing SMS, MMS or email warnings and advice to lottery entrants as well as by instituting restrictions for individual lottery participants. Moreover, restrictions and changes can be made to the lottery game itself. The lottery provider or operator may also, optionally, exclude individuals entirely.

-and/or-

3. A database or other utility may be utilized, created in association with the operation of the lottery, so that the lottery game automatically enforces age limits or other terms or conditions of the specific lottery game itself (which may be changed from game to game or country to country or state to state, for example). For example, the details submitted by the lottery entrant in Step I ("Registering the Customer") maybe transmitted to or checked against a database and/or cross-referenced with data sources to verify the identity of the player and/or the age of the player and/or the playing habits of the player.

Although various embodiments of lotteries (or sweepstakes or other games) are described herein which involve photographs or video footage as entry tickets, social media entry pathways, alpha-numeric entry and selection phases, among others, additional embodiments which combine such lottery types and games are contemplated. For example, in embodiments in which photographs or video footage is/are submitted as a lottery entry, the winner selection phase (e.g., where a photograph entry is selected as a winner) may be preceded by an alpha-type (or alpha-numeric) lottery. By way of further explanation of one such example contemplated, the first phase of an envisioned lottery may include a word or sentence matching stage which must be successfully completed to compete in the photograph (or video) entry phase. By combining such embodiments, the technological benefits of both may be realized. For example, the ease of deployment and certainty in winner selection may be obtained with the photo-entry portion of the lottery with the addition of alphabet characters to the lottery adding complexity to that portion of the drawing phase (to assist in minimizing or preventing duplicate winners). Additionally, utilizing such a hybrid lottery, additional revenue can be realized by including the additional play stage. For example, increased revenue may be generated by utilizing a per-letter entry fee structure for a dual-stage lottery (as compared to a single stage lottery) where the second and winning stage of the lottery is determined by selecting the photograph (or video footage) of the lottery (or sweepstakes) winner.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

I claim:

1. A lottery database, wherein data comprising said lottery database is accumulated by recording data generated from performing the following gaming method steps:

a sponsor displaying an advertisement accompanied by a game invitation in association with a spectator event;

providing a network, including data transmission and storage mechanisms, for game contestants to electronically submit digital images for game participation;

a plurality of spectators of said spectator event, becoming game contestants and entering said game, by generating a digital image utilizing a camera, a cellular phone with a built-in camera, or a kiosk and electronically submitting said digital images representing lottery tickets, as well as contestant information, to said network, for game participation, said digital images comprising at least one still image or video sequence selected from a personal photograph, a family photograph, a pet photograph, video footage personal to the game contestant, video footage depicting a family member, and video footage depicting a pet, said digital images being electronically submitted utilizing an MMS message or an internet connection, said digital images being stored on lottery servers;

generating an entry number for each digital image submitted utilizing a number generator, each said entry number being derived from digital image information obtained from each said respective, submitted digital image, and affiliating each said derived entry number with each said digital image from which it is derived;

electronically processing said digital images and contestant information and said derived entry number, utilizing software provided on said game contestants' computer(s) or mobile device(s) or upon receipt of said digital images by a server of said lottery provider, to form a plurality of information capsules comprising a plurality of digital image lottery tickets, each said digital image lottery ticket corresponding to an individual entrant of said game;

entering said plurality of digital image lottery tickets into an electronic batch;

selecting a winner number in a winner selection phase and matching said winner number with one of said plurality of derived entry numbers to thereby determine a winning ticket of said lottery;

wherein because lottery entry is accomplished electronically by submitting said digital images via said MMS message or said internet connection, new lotteries can be initiated and completed in compressed time periods; and wherein said lottery database is used to monitor activity selected from the group comprising: contestant ticket purchases, entrant demographics, lottery revenue generated, contractual compliance, legal compliance, and lottery transactions.

2. The lottery database according to claim 1, wherein said gaming method steps further comprise the steps of:

prior to the step of selecting and designating a winning ticket, selecting a subset number of said plurality of digital image lottery tickets which is less than the total number of said plurality of digital image lottery tickets and designating said subset number of selected digital image lottery tickets as winners of an intermediate stage of said lottery; and at said intermediate stage, displaying images of intermediate stage winners on a television show, web broadcast, website, mobile device broadcast, or software generated graphical user interface; and when a final, single winning digital image lottery ticket is selected, displaying the image submitted by the winning contestant on said television show, web broadcast, website, mobile device broadcast, or software generated graphical user interface.

3. The lottery database according to claim 2, wherein said gaming method steps further comprise the steps of:

deriving unique identifying numbers from data from each digital image submitted by game participants as a lottery ticket; and utilizing said unique identifying numbers, as digital image lottery ticket numbers, to identify one or more winning game entrants.

4. A lottery database, wherein data comprising said lottery database is accumulated by recording data generated from performing the following gaming method steps:

a sponsor displaying an advertisement accompanied by a game invitation in association with a spectator event;

providing a network, including data transmission and storage mechanisms, for game contestants to electronically submit digital images for game participation;

a plurality of spectators of said spectator event, becoming said game contestants and entering said game, by generating a digital image utilizing a camera, a cellular phone with a built-in camera, a scanner, or a kiosk, and electronically submitting said digital images representing lottery tickets, as well as contestant information, to the network, for said game participation, said digital images comprising at least one still image or video sequence selected from a personal photograph, a family photograph, a pet photograph, video footage personal to the game contestant, video footage depicting a family member, and video footage depicting a pet, the digital images being electronically submitted utilizing an MMS message or an internet connection, said digital images being stored on lottery servers;

generating a random entry number for each submitted digital image utilizing a random number generator, each said random entry number being derived from digital image information obtained from each said respective, submitted digital image, and affiliating each said derived random entry number with each said digital image from which it is derived;

electronically processing said digital images and contestant information and said derived random entry number, utilizing software provided on said lottery contestants' computer(s) or mobile device(s) or upon receipt of said digital images by a server of said lottery provider, to form a plurality of information capsules comprising a plurality of digital image lottery tickets, each said digital image lottery ticket corresponding to an individual entrant of said game;

entering said plurality of digital image lottery tickets into an electronic batch;

randomly selecting a random winner number in a winner selection phase and matching said random winner number with one of said plurality of derived random entry numbers to thereby determine a winning ticket of said lottery;

wherein because lottery entry is accomplished electronically by submitting said digital images via said MMS message or said internet connection, new lotteries can be initiated and completed in compressed time periods; and wherein said lottery database is used to monitor activity selected from the group comprising: contestant ticket purchases, entrant demographics, lottery revenue generated, contractual compliance, legal compliance, and lottery transactions.

5. The lottery database according to claim 4, wherein said gaming method steps further comprise the steps of:

prior to the step of selecting and designating a winning ticket, selecting a subset number of said plurality of digital image lottery tickets which is less than the total number of said plurality of digital image lottery tickets and designating said subset number of selected digital image lottery tickets as winners of an intermediate stage of said lottery; and at said intermediate stage, displaying images of intermediate stage winners on a television show, web broadcast, website, mobile device broadcast, or software generated graphical user interface; and when a final, single winning digital image lottery ticket is selected, displaying the image submitted by the winning contestant on said television show, web broadcast, website, mobile device broadcast, or software generated graphical user interface.

6. The lottery database according to claim 5, wherein said gaming method steps further comprise the steps of:

deriving unique identifying numbers from data from each digital image submitted by game participants as a lottery ticket; and utilizing said unique identifying numbers, as digital image lottery ticket numbers, to identify one or more winning game entrants.

7. A lottery database, wherein data comprising said lottery database is accumulated by recording data generated from performing the following lottery method steps:

a) a lottery contestant generating a digital image utilizing a camera, a cellular phone with a built-in camera, a scanner, or a kiosk and electronically submitting said digital image to a lottery provider for lottery participation utilizing an MMS message or an internet connection, said digital image being stored on lottery servers, and said digital image comprising at least one still image or video sequence selected from a personal photograph, a family photograph, a pet photograph, video footage personal to the lottery contestant, video footage depicting a family member, and video footage depicting a pet; said lottery contestant also submitting payment to said lottery provider for lottery participation utilizing mobile billing, a merchant account, a debit or credit card account, or an account deduction from a pre-paid account;

b) electronically encrypting said digital image and contestant information, utilizing software provided on said lottery contestant's computer or mobile device or upon receipt of said digital image by a server of said lottery provider, to form an information capsule comprising a lottery ticket;

c) generating a random entry number utilizing a random number generator, said random entry number being derived from digital image information obtained from said digital image, and affiliating said random entry number with said lottery ticket;

d) repeating steps a), b), and c) such that a plurality of lottery tickets are formed and a plurality of random entry numbers are generated and affiliated with said plurality of lottery tickets;

e) randomly selecting a random winner number in a winner selection phase and matching said random winner number with one of said plurality of random entry numbers to thereby determine a winning ticket of said lottery;

f) decrypting said information capsule comprising said winning lottery ticket and obtaining information about the lottery contestant that submitted said winning ticket from said decrypted information capsule; and wherein said lottery database is used to monitor activity selected from the group comprising: contestant ticket purchases, entrant demographics, lottery revenue generated, contractual compliance, legal compliance, and lottery transactions.

8. The lottery database according to claim 7, wherein said lottery method steps further comprise the step of integrating said lottery into one of the group consisting of: a television show, web broadcast, website, mobile device broadcast, or software generated graphical user interface.

9. The lottery database according to claim 8, wherein said lottery method steps further comprise the steps of:

prior to the step of randomly selecting a random winner number in said winner selection phase and matching said random winner number to determine a winning ticket, selecting a subset number of said plurality of lottery tickets which is less than the total number of said plurality of lottery tickets and designating said subset number of selected lottery tickets as winners of an intermediate stage of said lottery.

10. The lottery database according to claim 9, wherein said lottery method steps further comprise the steps of:

at said intermediate stage, displaying said digital images of intermediate stage winners on said television show, web broadcast, website, mobile device broadcast, or software generated graphical user interface; and when a final, single winning ticket is selected, displaying said digital image submitted by the winning contestant on said television show, web broadcast, website, mobile device broadcast, or software generated graphical user interface.

11. The lottery database according to claim 10, wherein said lottery method steps further comprise the step of logging each said random entry number, affiliated with each said lottery ticket which form said plurality of lottery tickets, for use in performing the intermediate stage winner selection or winner selection steps.

12. A lottery database, wherein data comprising said lottery database is accumulated by recording data generated from performing the following lottery method steps:

a) a lottery contestant generating a digital image utilizing a camera, a cellular phone with a built-in camera, a scanner, or a kiosk and electronically submitting said digital image to a lottery provider for lottery participation utilizing an MMS message or an internet connection, said digital image being stored on lottery servers, and said digital image comprising at least one still image or video sequence selected from a personal photograph, a family photograph, a pet photograph, video footage personal to the lottery contestant, video footage depicting a family member, and video footage depicting a pet; said lottery contestant also submitting payment to said lottery provider for lottery participation utilizing mobile billing, a merchant account, a debit or credit card account, or an account deduction from a pre-paid account;

b) electronically encrypting said digital image and contestant information, utilizing software provided on said lottery contestant's computer or mobile device or upon receipt of said digital image by a server of said lottery provider, to form an information capsule comprising a lottery ticket;

c) generating an entry number for said digital image utilizing a number generator, said entry number being derived from digital image information obtained from said digital image, and affiliating said derived entry number with said lottery ticket;

d) repeating steps a), b), and c) such that a plurality of lottery tickets are formed and a plurality of derived entry numbers are generated and affiliated with said plurality of lottery tickets;

e) selecting a winner number in a winner selection phase and matching said winner number with one of said plurality of derived entry numbers to thereby determine a winning ticket of said lottery;

f) decrypting said information capsule comprising said winning lottery ticket and obtaining information about the lottery contestant that submitted said winning ticket from said decrypted information capsule; and wherein said lottery database is used to monitor activity selected from the group comprising: contestant ticket purchases, entrant demographics, lottery revenue generated, contractual compliance, legal compliance, and lottery transactions.

13. The lottery database according to claim 12, wherein said lottery method steps further comprise the step of integrating said lottery into one of the group consisting of: a television show, web broadcast, website, mobile device broadcast, or software generated graphical user interface.

14. The lottery database according to claim 13, wherein said lottery method steps further comprise the steps of:

prior to the step of selecting a winner number in said winner selection phase and matching said winner number to determine a winning ticket, selecting a subset number of said plurality of lottery tickets which is less than the total number of said plurality of lottery tickets and designating said subset number of selected lottery tickets as winners of an intermediate stage of said lottery.

15. The lottery database according to claim 14, wherein said lottery method steps further comprise the steps of:

at said intermediate stage, displaying said digital images of intermediate stage winners on said television show, web broadcast, website, mobile device broadcast, or software generated graphical user interface; and when a final, single winning ticket is selected, displaying said digital image submitted by the winning contestant on said television show, web broadcast, website, mobile device broadcast, or software generated graphical user interface.

16. The lottery database according to claim 15, wherein said lottery method steps further comprise the step of logging each said entry number, affiliated with each said lottery ticket which form said plurality of lottery tickets, for use in performing the intermediate stage winner selection or winner selection steps.

* * * * *